(12) United States Patent
Miyazaki

(10) Patent No.: US 10,747,417 B2
(45) Date of Patent: *Aug. 18, 2020

(54) INFORMATION PROCESSING APPARATUS, INFORMATION PROCESSING METHOD AND INFORMATION PROCESSING PROGRAM FOR USING A CURSOR

(71) Applicant: LINE Corporation, Shinjuku-ku, Tokyo (JP)

(72) Inventor: Reiko Miyazaki, Tokyo (JP)

(73) Assignee: Line Corporation, Tokyo (JP)

( * ) Notice: Subject to any disclaimer, the term of this patent is extended or adjusted under 35 U.S.C. 154(b) by 408 days.

This patent is subject to a terminal disclaimer.

(21) Appl. No.: 14/827,787

(22) Filed: Aug. 17, 2015

(65) Prior Publication Data

US 2015/0355809 A1 Dec. 10, 2015

Related U.S. Application Data

(63) Continuation of application No. 13/187,922, filed on Jul. 21, 2011, now Pat. No. 9,110,579.

(30) Foreign Application Priority Data

Jul. 30, 2010 (JP) .................................. 2010-172892

(51) Int. Cl.
*G06F 3/0486* (2013.01)
*G06F 3/0485* (2013.01)
(Continued)

(52) U.S. Cl.
CPC ............ *G06F 3/0486* (2013.01); *G06F 3/017* (2013.01); *G06F 3/0485* (2013.01);
(Continued)

(58) Field of Classification Search
CPC .......... G06F 3/011; G06F 3/005; G06F 3/017; G06F 3/0482; G06F 3/0485;
(Continued)

(56) References Cited

U.S. PATENT DOCUMENTS 5,926,178 A 7/1999 Kurtenbach
6,434,564 B2 8/2002 Ebert
(Continued)

FOREIGN PATENT DOCUMENTS

CN 1638053 A 9/2006
CN 101630228 A 1/2010
(Continued)

OTHER PUBLICATIONS

Jan. 28, 2016, Extended European Search Report for related EP application No. 11172847.3.
(Continued)

*Primary Examiner* — Andrew L Tank
(74) *Attorney, Agent, or Firm* — Harness, Dickey & Pierce, P.L.C.

(57) ABSTRACT

An information processing apparatus includes: an operation section; and a control section adapted to cause, when dragging is carried out through the operation section, a cursor interconnecting a start point and an end point of the dragging to be displayed on a display section in response to the dragging and execute, where a direction from one end portion of the cursor which is a start point side of the dragging to the other end portion of the cursor which is an end point side of the dragging is determined as a direction of the cursor, a process corresponding to the direction of the cursor for information displayed on the display section; the control section changing the information to be displayed on
(Continued)

the display section when the other end portion of the cursor enters a predetermined region set on the screen by the dragging.

12 Claims, 25 Drawing Sheets

(51) Int. Cl.
*G06F 3/01* (2006.01)
*G06F 3/0484* (2013.01)
*G06F 3/0481* (2013.01)
*G06F 3/0488* (2013.01)

(52) U.S. Cl.
CPC ........ *G06F 3/0488* (2013.01); *G06F 3/04812* (2013.01); *G06F 3/04842* (2013.01)

(58) Field of Classification Search
CPC .. G06F 3/0488; G06F 3/04845; G06F 3/0486; G06F 3/04842; G06F 3/04812
See application file for complete search history.

(56) References Cited

U.S. PATENT DOCUMENTS

| | | | |
|---|---|---|---|
| 6,618,063 B1 | 9/2003 | Kurtenbach | |
| 6,677,965 B1* | 1/2004 | Ullmann | G06F 3/04812 715/786 |
| 7,111,240 B2 | 9/2006 | Crow et al. | |
| 7,366,995 B2 | 4/2008 | Montague | |
| 7,877,705 B2 | 1/2011 | Chambers et al. | |
| 8,019,388 B2 | 9/2011 | Chiam et al. | |
| 8,082,518 B2* | 12/2011 | Flake | G06F 3/0481 715/785 |
| 8,136,052 B2 | 3/2012 | Shin et al. | |
| 8,146,021 B1* | 3/2012 | Asente | G06F 3/04845 715/765 |
| 8,225,225 B2 | 7/2012 | Jetha et al. | |
| 8,321,802 B2 | 11/2012 | Rogers | |
| 8,375,336 B2 | 2/2013 | Matthews et al. | |
| 8,458,618 B2 | 6/2013 | Nezu et al. | |
| 8,533,599 B2 | 9/2013 | Son | |
| 8,578,294 B2 | 11/2013 | Eom et al. | |
| 8,601,389 B2 | 12/2013 | Schulz et al. | |
| 8,601,394 B2 | 12/2013 | Sheehan et al. | |
| 8,650,507 B2 | 2/2014 | Westerman et al. | |
| 8,656,311 B1 | 2/2014 | Harper et al. | |
| 8,667,426 B2 | 3/2014 | Matsubara et al. | |
| 2009/0044124 A1* | 2/2009 | Pihlaja | G06F 3/0488 715/733 |
| 2009/0153288 A1 | 6/2009 | Hope et al. | |
| 2009/0179867 A1 | 7/2009 | Shim et al. | |
| 2009/0213086 A1* | 8/2009 | Chae | G06F 3/0482 345/173 |
| 2010/0229125 A1 | 9/2010 | Cha | |
| 2010/0241973 A1 | 9/2010 | Whiddett | |
| 2011/0167387 A1 | 7/2011 | Stallings et al. | |
| 2011/0199318 A1 | 8/2011 | Fong et al. | |
| 2011/0320984 A1 | 12/2011 | Irani et al. | |
| 2013/0151967 A1* | 6/2013 | Kerr | H04N 5/44513 715/716 |

FOREIGN PATENT DOCUMENTS

| | | |
|---|---|---|
| CN | 101635768 A | 1/2010 |
| CN | 101719039 A | 6/2010 |
| EP | 1860537 A2 | 11/2007 |
| EP | 2136290 A2 | 12/2009 |
| JP | 2002-328040 | 11/2002 |
| KR | 10-2010-0028465 | 3/2010 |
| TW | 200805132 A | 1/2008 |
| WO | WO2005/067511 A2 | 7/2005 |
| WO | WO-2009108584 A2 | 9/2009 |
| WO | WO2009/142880 A1 | 11/2009 |
| WO | WO-2010050475 A1 | 5/2010 |

OTHER PUBLICATIONS

Office Action dated Feb. 14, 2020, issued in corresponding European Patent Application No. 11172847.3.
Office Action dated Apr. 26, 2013, issued in corresponding Chinese Patent Application No. 201110216742.4.
Office Action dated Dec. 24, 2013, issued in corresponding Chinese Patent Application No. 201110216742.4.
Office Action dated Jul. 10, 2014, issued in corresponding Chinese Patent Application No. 201110216742.4.
Office Action dated Apr. 27, 2017, issued in corresponding Chinese Patent Application No. 201110216742.4.

* cited by examiner

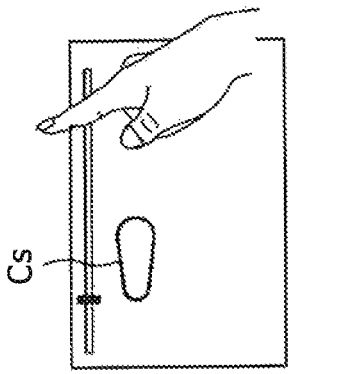

ADJUSTMENT OF PARAMETER
(SOUND VOLUME)

(ADJUSTMENT DIRECTION AND VALUE OF
ADJUSTMENT SPEED OF SOUND VOLUME
ARE CONTROLLED IN RESPONSE TO DIRECTION
AND LENGTH OF STRETCHABLE CURSOR)

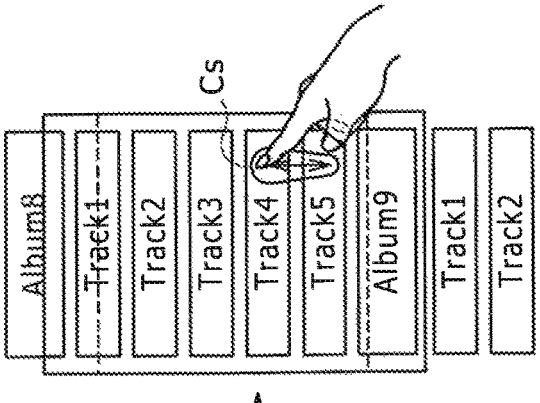
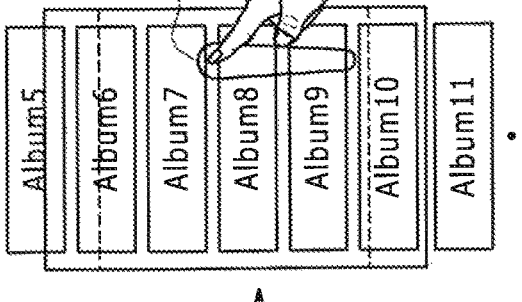
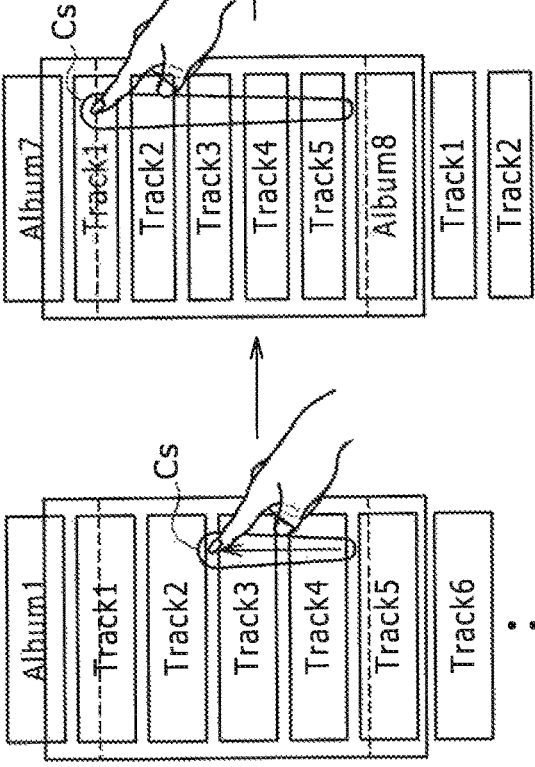

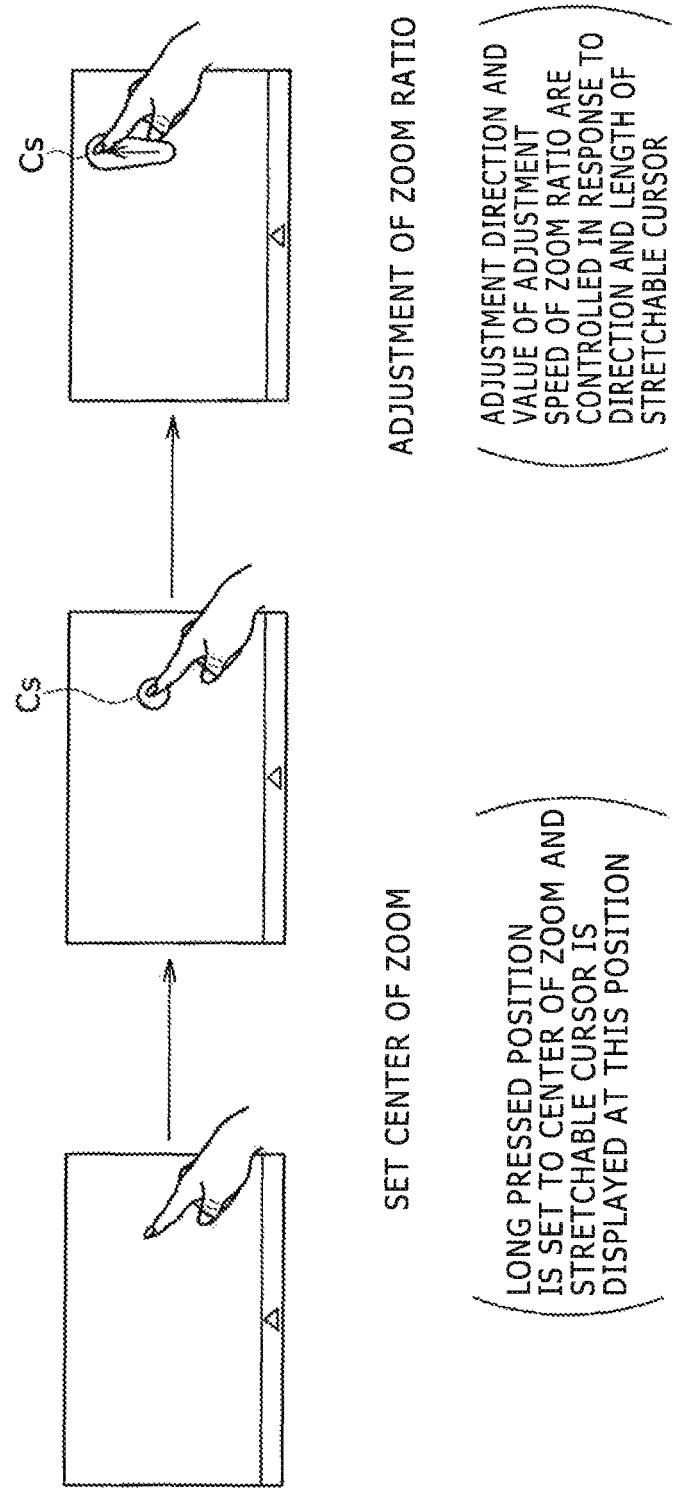

(ADJUSTMENT OF LUMINANCE
ADJUSTMENT DIRECTION AND VALUE OF ADJUSTMENT SPEED OF LUMINANCE ARE CONTROLLED IN RESPONSE TO DIRECTION AND LENGTH OF STRETCHABLE CURSOR)

(ADJUSTMENT OF SATURATION
ADJUSTMENT DIRECTION AND VALUE OF ADJUSTMENT SPEED OF SATURATION ARE CONTROLLED IN RESPONSE TO DIRECTION AND LENGTH OF STRETCHABLE CURSOR)

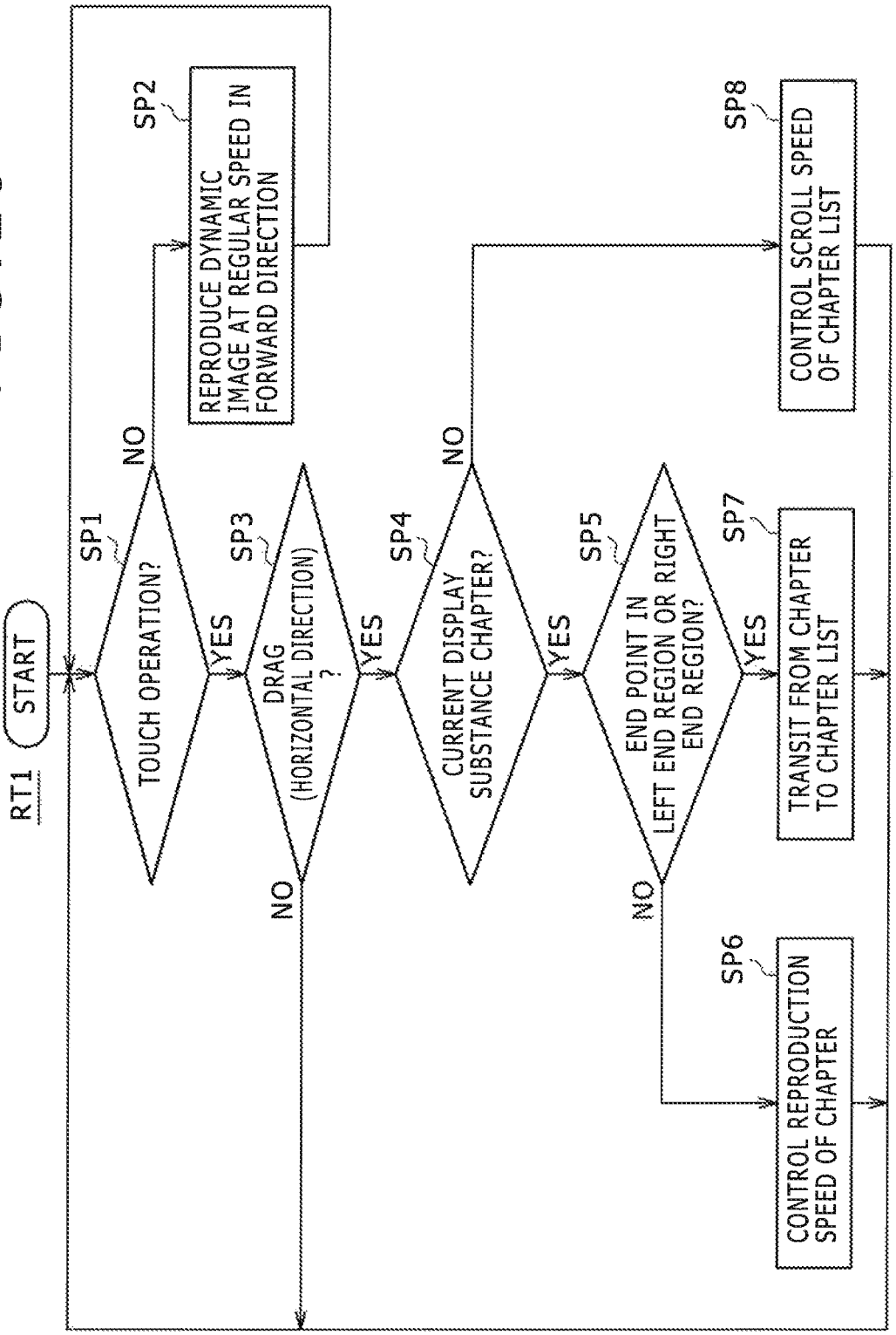

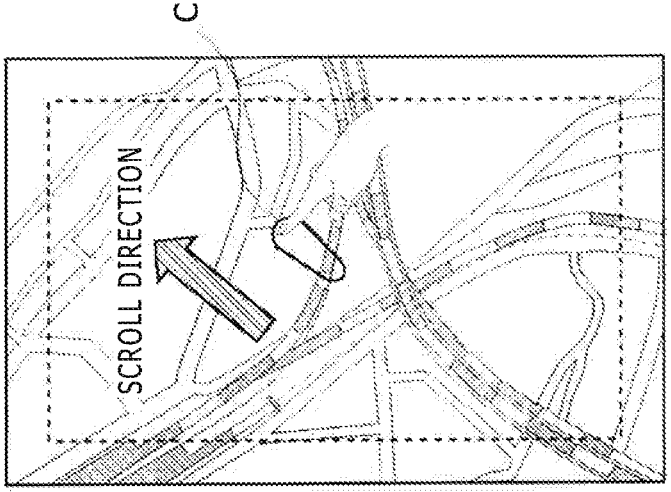
FIG. 26A / FIG. 26B / FIG. 26C

SET CENTER OF ZOOM (SET TAPPED POSITION TO CENTER OF ZOOM AND DISPLAY STRETCHABLE CURSOR AT THIS POSITION)

ADJUSTMENT OF ZOOM RATIO (CONTROL ADJUSTMENT DIRECTION OF ZOOM RATIO AND VALUE OF ADJUSTMENT SPEED IN RESPONSE TO DIRECTION AND LENGTH OF STRETCHABLE CURSOR)

NORMAL SCROLL MODE (SCROLL MAP IMAGE BY AMOUNT CORRESPONDING TO LENGTH OF DRAG IN DIRECTION OPPOSITE TO DRAG DIRECTION)

STRETCHABLE SCROLL MODE (CONTROL SCROLL DIRECTION OF MAP IMAGE AND VALUE OF SCROLL SPEED IN RESPONSE TO DIRECTION AND LENGTH OF STRETCHABLE CURSOR)

INFORMATION PROCESSING APPARATUS, INFORMATION PROCESSING METHOD AND INFORMATION PROCESSING PROGRAM FOR USING A CURSOR

CROSS-REFERENCE TO PRIOR APPLICATION

This application is a continuation of U.S. patent application Ser. No. 13/187,922 (filed on Jul. 21, 2011), which claims priority to Japanese Patent Application No. 2010-172892 (filed on Jul. 30, 2010), which are all hereby incorporated by reference in their entirety.

BACKGROUND

The present technology relates to an information processing apparatus, an information processing method and an information processing program, and more particularly to an information processing apparatus which allows an operation input, for example, through dragging as an intuitive operation.

Recently, information processing apparatus having various operation devices have been popularized. For example, an information processing apparatus having a touch screen allows an intuitive operation for the screen by a touch operation, a tapping operation which is touching and unhanding, dragging, flicking or the like.

As one of such information processing apparatus, for example, a navigation apparatus has been proposed, for example, in Japanese Patent Laid-Open No. 2002-328040. In the navigation apparatus, if dragging is carried out within a predetermined region set on the screen, then the scale of a map displayed on the screen is changed in response to the dragging.

SUMMARY

Incidentally, in the navigation apparatus described above, changeover between expansion and reduction can be carried out by changing the direction of dragging in a predetermined region. However, both of expansion and reduction are nothing but processes for changing the scale of a map, and after all, dragging in the predetermined region can only change the scale of a map.

Therefore, in the navigation apparatus described above, for example, in order to change a map to be expanded or reduced to another map, an operation for changing the map must be carried out separately. Therefore, the navigation apparatus is not necessarily considered high in operability.

Therefore, it is desirable to provide an information processing apparatus, an information processing method and an information processing program which are improved significantly in comparison with an information processing apparatus, an information processing method and an information processing program in the past when an operation input by dragging is carried out.

According to an embodiment of the technology disclosed herein, there is provided an information processing apparatus including an operation section, and a control section adapted to cause, when dragging is carried out through the operation section, a cursor interconnecting a start point and an end point of the dragging to be displayed on a display section in response to the dragging and execute, where a direction from one end portion of the cursor which is a start point side of the dragging to the other end portion of the cursor which is an end point side of the dragging is determined as a direction of the cursor, a process corresponding to the direction of the cursor for information displayed on the display section, the control section changing the information to be displayed on the display section when the other end portion of the cursor enters a predetermined region set on the screen.

In the information processing apparatus, not only it is possible to execute a process for information displayed on the display section but also it is possible to change the information to be displayed on the display section, that is, information of an object of processing, only by a series of dragging operations.

According to the present technology, not only it is possible to execute a process for information displayed on the display section but also it is possible to change the information to be displayed on the display section, that is, information of an object of processing, only by a series of dragging operations. Thus, where an operation input is carried out by dragging, the operability can be improved significantly in comparison with an information processing apparatus, information processing method and information processing program in the past.

BRIEF DESCRIPTION OF THE DRAWINGS

FIGS. 13A to 13D are schematic vies illustrating an example of an operation input through the stretchable cursor in a dynamic image reproduction application;

FIGS. 16A to 16D are schematic views illustrating an example of an operation input through the stretchable cursor in a tune reproduction application;

FIGS. 18A to 18C are schematic views illustrating an example of an operation input through the stretchable cursor in a still image reproduction application;

FIGS. 20 to 24 are flow charts illustrating different operation input processing procedures;

FIGS. 26A to 26C are schematic views illustrating an example of an operation input through the stretchable cursor in a map displaying application;

DETAILED DESCRIPTION OF THE PREFERRED EMBODIMENTS

In the following, preferred embodiments of the disclosed technology are described. It is to be noted that the description is given in the following order.
1. Outline of the Embodiments
2. First Embodiment
3. Second Embodiment
4. Other Embodiments

1. Outline of the Embodiments

First, an outline of the embodiments is described. After the outline is described, description is given of the first embodiment, the second embodiment and other embodiments.

Figure 1:
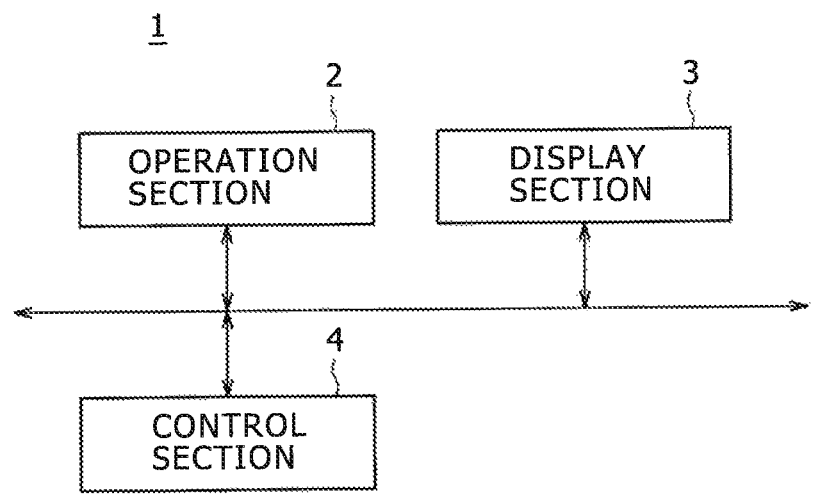
FIG. 1 is a block diagram showing a functional configuration of an information processing apparatus according to an embodiment of the disclosed technology.

FIG. 1 shows an information processing apparatus 1. The information processing apparatus 1 includes an operation section 2. The information processing apparatus 1 further includes a display section 3, and a control section 4 which controls the display section 3 to display, when dragging is carried out through the operation section 2, a cursor interconnecting a start point and an end point of the dragging to each other in response to the dragging. The control section 4 also executes, where a direction from one end portion of the cursor which is a start point side of the dragging to the other end portion of the cursor which is an end point side of the dragging is determined as a direction of the cursor, a process corresponding to the direction of the cursor for information displayed on the display section 3.

Also, the control section 4 changes the information to be displayed on the display section 3 when the other end portion of the cursor enters a predetermined region set on the screen by the dragging.

Thus, not only it is possible to execute a process for information displayed on the display section 3 but also it is possible to change the information to be displayed on the display section 3, that is, information of an object of processing, only by a series of dragging operations.

Also, the control section 4 may execute a process corresponding to the direction and the length of the cursor for the information displayed on the display section 3.

In particular, the control section 4 causes, from between first hierarchy information of a first hierarchy and second hierarchy information of a second hierarchy which is a higher hierarchy with respect to the first hierarchy, the first hierarchy information to be displayed on the display section 3. Then, the control section 4 changes, when the other end portion of the cursor enters the predetermined region set on the screen by the dragging, the information to be displayed on the display section 3 from the first hierarchy information to the second hierarchy information. It is to be noted that the predetermined region is set, for example, to an end portion of the screen.

Also, the control section 4 returns, if, after the information to be displayed on the display section 3 is changed from the first hierarchy information to the second hierarchy information, the dragging is continued until the length of the cursor becomes smaller than a predetermined threshold value, the information to be displayed on the display section 3 from the second hierarchy information to the first hierarchy information.

Here, the first hierarchy information is a dynamic image while the second hierarchy information is an extracted image list configured from images extracted from the dynamic image. In this instance, the control section 4 causes the dynamic image to be displayed on the display section 3, and changes, when the other end portion of the cursor enters the predetermined region set on the screen by the dragging, the information to be displayed on the display section 3 from the dynamic image to the extracted image list. Further, the control section 4 executes, when the dynamic image is displayed on the display section 3, a process of reproducing the dynamic image at a reproduction speed corresponding to the direction and the length of the cursor. Furthermore, the control section 4 executes, when the extracted image list is displayed on the display section 3, a process of scrolling the extracted image list at a scroll speed corresponding to the direction and the length of the cursor.

Also, the first hierarchy information is a track list configured from titles of tunes while the second hierarchy information is an album list configured from albums in which the tunes are collected. In this instance, the control section 4 causes the track list to be displayed on the display section 3, and changes, when the other end portion of the cursor enters the predetermined region set on the screen by the dragging, the information to be displayed on the display section 3 from the track list to the album list. Further, the control section 4 executes, when the track list is displayed on the display section 3, a process of scrolling the track list at a scroll speed corresponding to the direction and the length of the cursor. Furthermore, the control section 4 executes, when the album list is displayed on the display section 3, a process of scrolling the album list at a scroll speed corresponding to the direction and the length of the cursor.

Further, the control section 4 erases, when the dragging comes to an end, the display of the cursor and returns the information to be displayed on the display section 3 to the first hierarchy information.

Furthermore, the control section 4 changes, when the information to be displayed on the display section 3 is changed from the first hierarchy information to the second hierarchy information and then the dragging is continued until the other end portion of the cursor goes out of the predetermined region and then enters the predetermined region again, the information to be displayed on the display section 3 from the second hierarchy information to third hierarchy information of a third hierarchy which is a higher hierarchy with respect to the second hierarchy.

Particular examples of the information processing apparatus 1 having such a configuration as described above are described in detail below.

2. First Embodiment

2-1. Appearance Configuration of a Portable Terminal

Figure 2:
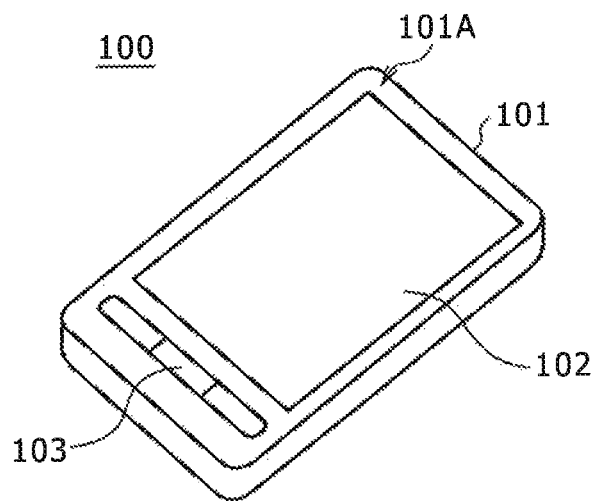
FIG. 2 is a perspective view showing an appearance configuration of a portable terminal.

Now, the first embodiment is described. First, an appearance configuration of a portable terminal 100 which is a particular example of the information processing apparatus described above is described with reference to FIG. 2.

The portable terminal 100 includes a housing 101 of a substantially flattened rectangular shape having such a size that it can be grasped by one hand.

A touch screen 102 of a rectangular shape is provided at a mid portion of a front face 101A of the housing 101. The touch screen 102 is configured from a liquid crystal panel and a thin transparent touch panel which covers a display face of the liquid crystal panel. Incidentally, the touch panel is, for example, of the capacitance type.

The portable terminal 100 accepts a touch operation with the touch screen 102 by a finger, a touch pen or the like as an operation input by a user.

Also an operation button 103 is provided in the proximity of the touch screen 102 on the front face 101A of the housing 101 of the portable terminal 100.

It is to be noted that the portable terminal 100 can be used in any of a direction in which the rectangular touch screen 102 is in a vertically elongated state, that is, in a vertical direction and another direction in which the rectangular touch screen 102 is in a horizontally elongated state, that is, in a horizontal direction.

2-2. Hardware Configuration of the Portable Terminal

Figure 3:
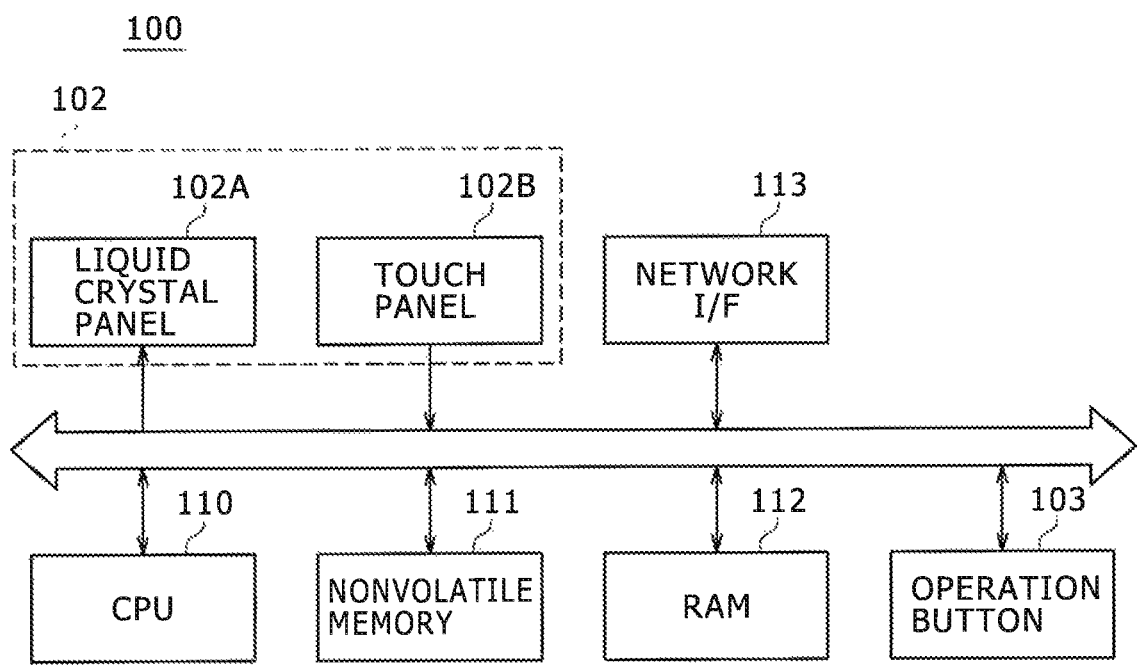
FIG. 3 is a block diagram showing a hardware configuration of the portable terminal.

Now, a hardware configuration of the portable terminal 100 is described with reference to FIG. 3. The portable terminal 100 includes a CPU 110 which reads out and develops a program stored in a nonvolatile memory 111 into a RAM 112 to execute various processes and control associated components of the portable terminal 100 in accordance with the program. It is to be noted that the term CPU is an abbreviated form of Central Processing Unit and the term RAM is an abbreviated form of Random Access Memory.

The touch screen 102 is configured from a liquid crystal panel 102A which is a display device for displaying various kinds of information thereon and a touch panel 102B which is an operation inputting device for accepting an operation input.

The touch panel 102B detects, if an arbitrary position thereon is touched with a finger, a coordinate of the touched position. Then, the touch panel 102B sends an input signal representative of the coordinate of the touched position to the CPU 110.

It is to be noted that, while the touch panel 102B continues to be touched such as while dragging is carried out, the touch panel 102B sends an input signal representative of the coordinate of the touched position after every fixed interval of time to the CPU 110.

When the CPU 110 acquires a coordinate of a touched position from an input signal sent thereto from the touch panel 102B, it converts the coordinate into a screen coordinate of the liquid crystal panel 102A to recognize at which position the screen of the liquid crystal panel 102A is touched. In other words, the CPU 110 recognizes the touched position on the screen.

Further, the CPU 110 successively converts a coordinate of a touched position acquired from an input signal sent thereto after every fixed interval of time into a screen coordinate of the liquid crystal panel 102A and recognizes in what manner the touched position moves, or in other words, recognizes a locus of the touched position.

The CPU 110 specifies, based on the touched position and the locus of the touched position recognized in this manner, what touch operation is carried out for the screen. Then, the CPU 110 accepts the touch operation as an operation input and executes a process in accordance with the operation input.

It is to be noted that the CPU 110 accepts such touch operations as touching, tapping, dragging and flicking as operation inputs.

Further, if the CPU 110 recognizes a press operation for the operation button 103, then it accepts the press operation as an operation input by a user and executes a process in accordance with the operation input.

Here, it is assumed that, in a state in which thumbnail images of images stored as image files in the nonvolatile memory 111 are displayed in a table on the touch screen 102, the user touches a desired one of the thumbnail images.

In this instance, the CPU 110 accepts the touch operation as an operation input for reproducing an image and reads out the image file corresponding to the touched thumbnail image from the nonvolatile memory 111.

If the corresponding image file is a still image file, then the CPU 110 extracts still image data from the still image file. Then, the CPU 110 carries out a predetermined reproduction process such as a decoding process, a digital to analog conversion process and so forth for the still image data to obtain a still image signal. Then, the CPU 110 controls the liquid crystal panel 102A of the touch screen 102 to display the still image signal.

On the other hand, if the corresponding image file is a dynamic image file, then the CPU 110 separates dynamic image data and audio data from the dynamic image file. Then, the CPU 110 carries out a predetermined reproduction process such as a decoding process, a digital to analog conversion process and so forth for the dynamic image data to obtain a video signal. Then, the CPU 110 controls the liquid crystal panel 102A of the touch screen 102 to display the video signal. Meanwhile, the CPU 110 carries out a predetermined reproduction process such as a decoding process, a digital to analog conversion process, an amplification process and so forth for the audio data to obtain an audio signal. Then, the CPU 110 outputs the audio signal through a headphone terminal not shown.

The portable terminal 100 reproduces an image designated by the user in this manner.

Meanwhile, it is assumed that, for example, in a state in which titles of tunes or tracks stored as music files in the nonvolatile memory 111 are displayed in a list on the touch screen 102, the user taps a desired one of the titles.

In this instance, the CPU 110 accepts the touch operation as an operation input for reproducing the tune and reads out the music file corresponding to the tapped title from the nonvolatile memory 111.

The CPU 110 extracts audio data from the music file. Then, the CPU 110 carries out a predetermined reproduction process such as a decoding process, a digital to analog conversion process, an amplification process and so forth for the audio data to obtain an audio signal. Then, the CPU 110 outputs the audio signal from the headphone terminal not shown.

The portable terminal. 100 reproduces the tune designated by the user in this manner.

Further, at this time, the CPU 110 extracts related information such as a jacket image, a title of the track, a title of an album, an artist name and so forth from the read out music file and controls the liquid crystal panel 102A of the touch screen 102 to display the related information.

The portable terminal 100 reproduces the tune designated by the user and displays the information relating to the tune in this manner.

It is to be noted that the portable terminal 100 is configured such that the CPU 110 can manage the music files based on the relating information of the individual music files in a hierarchical structure wherein a higher hierarchy includes the titles of albums and a lower hierarchy includes the titles of tracks.

Further, it is assumed that, for example, in a state in which an icon for startup of a Web browser is displayed on the touch screen 102, the user taps the icon.

In this instance, the CPU 110 accepts the touch operation as an operation input for starting up the Web browser and reads out and executes the program of the Web browser from the nonvolatile memory 111 to start up the Web browser.

Here, the CPU 110 controls the liquid crystal panel 102A of the touch screen 102 to display a screen image of the Web browser and receives page data of a Web page from a server on the network through a network interface 113. Then, the CPU 110 causes a page image based on the page data to be displayed on the screen of the Web browser.

In this manner, the portable terminal 100 starts up the Web browser to display the Web page.

In addition, a user interface which can carry out various operation inputs only by dragging which is one of touch operations is incorporated in the portable terminal 100.

In particular, in the portable terminal 100, information, also referred to as drag information, such as positions of a start point and an end point of dragging, a direction from the start point to the end point, a distance from the start point to the end point and so forth, and various operation inputs are associated with each other in advance.

It is to be noted that the start point of dragging is a touched position upon starting of dragging, that is, a first touched position, and the end point of dragging is a current touched position after the dragging is started. In other words, during dragging, the start point is fixed while the end point moves together with movement of the finger. It is to be noted that, in the following description, the positions of the start point and the end point of dragging are referred to also as start point and end point positions. Further, the direction from the start point to the end point of dragging is referred to also as start point-end point direction, and the distance from the start point to the end point of dragging is referred to also as start point-end point distance.

If dragging is carried out actually, then the CPU 110 acquires drag information such as the start point and end point positions, start point-end point direction and start point-end point distance from the dragging. Then, the CPU 110 accepts an operation input associated with the drag information.

In this manner, the portable terminal 100 can carry out various operation inputs only by dragging if the start point and end point positions, start point-end point direction and start point-end point distance are varied.

Incidentally, in order to make it possible to achieve good operability by such a user interface as just described, it is preferable to make it possible for the user to readily recognize the start point and end point positions, start point-end point direction and start point-end point distance of dragging.

Figure 4:
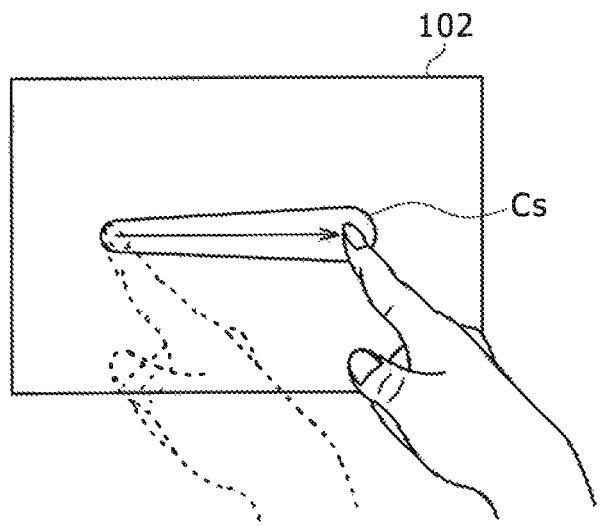
FIG. 4 is a schematic view illustrating display of a stretchable cursor.

Therefore, the portable terminal 100 is configured such that, when dragging is carried out, a cursor Cs visually representing start point and end point positions, a start point-end point direction and a start point-end point distance of the dragging is displayed on the touch screen 102 as seen in FIG. 4.

This cursor Cs stretches from the start point to the end point of dragging and changes the direction, that is, the stretching direction, or the length in accordance with the movement of the end point of the dragging so that it follows up the dragging. It is to be noted that, since the cursor Cs stretches and contracts in response to dragging, this is hereinafter referred to as stretchable cursor Cs.

By displaying the stretchable cursor Cs, the portable terminal 100 allows the user to readily recognize start point and end point positions, a start point-end point direction and a start point-end point distance of the dragging.

The stretchable cursor Cs and operation inputs by the stretchable cursor Cs are described more particularly below.

Incidentally, a particular hardware example of the operation section 2 of the information processing apparatus 1 described in the foregoing description in the outline of the embodiments is the touch panel 102B of the portable terminal 100 described hereinabove. Meanwhile, a particular hardware example of the display section 3 of the information processing apparatus 1 is the liquid crystal panel 102A of the portable terminal 100. Further, a particular hardware example of the control section 4 of the information processing apparatus 1 is the CPU 110 of the portable terminal 100.

2-3. Operation Input by the Stretchable Cursor 2-3-1. Basic Operation

Figure 5A:
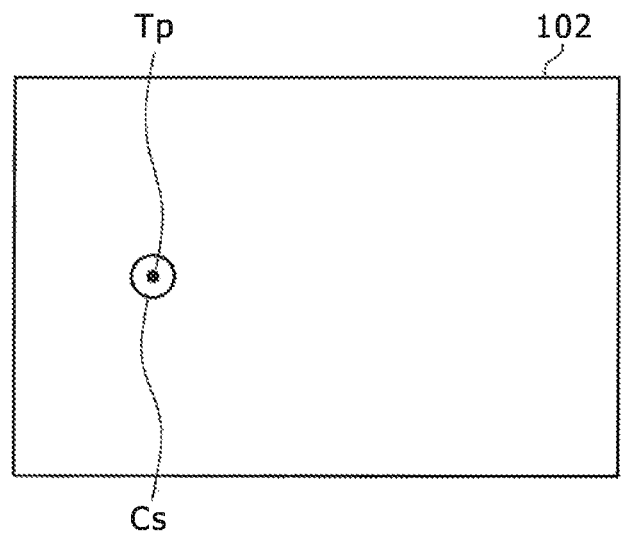
FIGS. 5A and 5B are schematic views illustrating a change of the shape of the stretchable cursor.

If the touch screen 102 is touched by a finger of a user, then the CPU 110 causes the touch screen 102 to display the stretchable cursor Cs of a circular shape centered at the touched position Tp as seen in FIG. 5A.

Figure 5B:
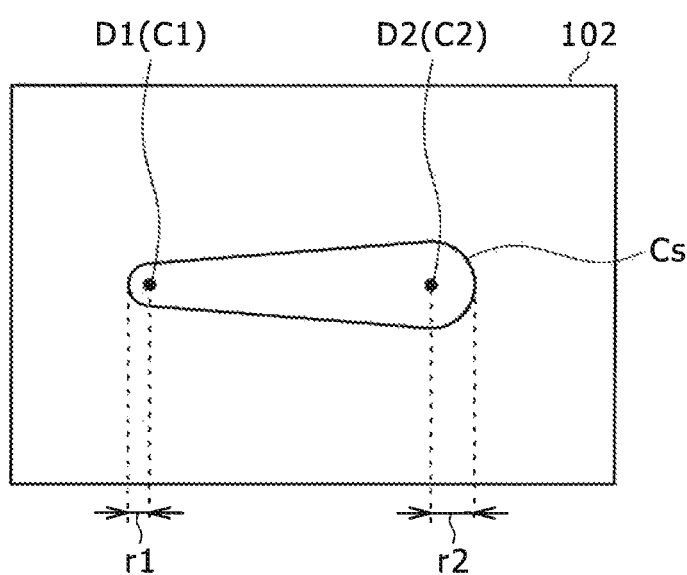

Thereafter, if dragging is carried out while the finger of the user remains touching with the touch screen 102, then the CPU 110 stretches the stretchable cursor Cs from a start point D1, that is, the first touched position Tp, of the dragging to an end point D2, that is, a touched position at present, of the dragging as seen in FIG. 5B.

Consequently, the portable terminal 100 allows the user to recognize that the touch operation is accepted as dragging and to carry out the dragging in such a feeling that the user directly touches with and stretches the stretchable cursor Cs.

Further, since the stretchable cursor Cs stretches from the start point D1 to the end point D2 of the dragging, the user can recognize the distance from the start point D1 to the end point D2 of the dragging, that is, the start point-end point distance.

It is to be noted that, in the following description, the position in the stretchable cursor Cs which corresponds to the start point D1 of the dragging is hereinafter referred to as start point C1 of the stretchable cursor Cs, and the position which corresponds to the end point D2 of the dragging is hereinafter referred to as end point C2 of the stretchable cursor Cs. In other words, the stretchable cursor Cs stretches from the start point C1 corresponding to the start point D01 of the dragging to the end point C2 corresponding to the end point D2 of the dragging.

Further, the stretchable cursor Cs is shaped such that the thickness thereof increases from the start point C1 side toward the end point C2 side. In particular, the stretchable cursor Cs is shaped such that it is thinnest at a portion thereof in the proximity of the start point C1 and is thickest at another portion thereof in the proximity of the end point C2.

By displaying the stretchable cursor Cs of such a shape as just described, the user can distinguish the start point D1 side and the end point D2 side of the dragging of the stretchable cursor Cs from each other. As a result, also it is possible to allow the user to recognize the direction from the start point D1 to the end point D2 of the dragging, that is, the start point-end point direction. Furthermore, also it is possible to allow the user to recognize the positions of the start point D1 and the end point D2 of the dragging, that is, the start point and end point positions.

Further, during dragging, while the start point C1 of the stretchable cursor Cs corresponding to the start point D1 of the dragging is fixed, the end point C2 of the stretchable cursor Cs corresponding to the end point D2 of the dragging moves following up the movement of the finger. Consequently, the portable terminal 100 allows the user to carry out dragging while recognizing the start point and end point positions, start point-end point direction and start point-end point distance of the dragging.

Further, the stretchable cursor Cs has, at an end portion thereof on the start point C1 side, a semicircle of a radius r1 centered at the start point C1. This allows the user to recognize that the center of the semicircle is the position of the start point D1 of the dragging. Consequently, the user can recognize the position of the start point D1 of the dragging more precisely.

Similarly, the stretchable cursor Cs has, at an end portion thereof on the end point C2 side, a semicircle of a radius r2 centered at the end point C2. This allows the user to recognize that the center of the semicircle is the position of the end point D2 of the dragging. Consequently, the user can recognize the position of the end point D2 of the dragging more precisely.

It is to be noted that, in the stretchable cursor Cs, the radius r2 on the end point C2 side is set to a value higher than that of the radius r1 on the start point C1 side.

Further, the CPU 110 displays the stretchable cursor Cs translucently.

Further, when the finger is spaced away from the touch screen 102 to end the dragging, the CPU 110 deforms the stretchable cursor Cs such that the end point C2 side of the stretchable cursor Cs moves toward the start point C1 side so that the stretchable cursor Cs is contracted until it has a circular shape, whereafter it disappears from the screen.

Further, the CPU 110 accepts various operation inputs in response to the positions of the start point C1 and the end point C2 of the displayed stretchable cursor Cs, direction of the stretchable cursor Cs from the start point C1 toward the end point C2, distance from the start point C1 to the end point C2 and so forth.

It is to be noted that, in the following description, the direction of the stretchable cursor Cs from the start point C1 toward the end point C2 is suitably referred to as direction of the stretchable cursor Cs, and the distance from the start point C1 to the end point C2 of the stretchable cursor Cs is suitably referred to as length of the stretchable cursor Cs.

The CPU 110 controls, for example, the reproduction speed of a dynamic image in response to an operation input through the stretchable cursor Cs.

Figure 6:
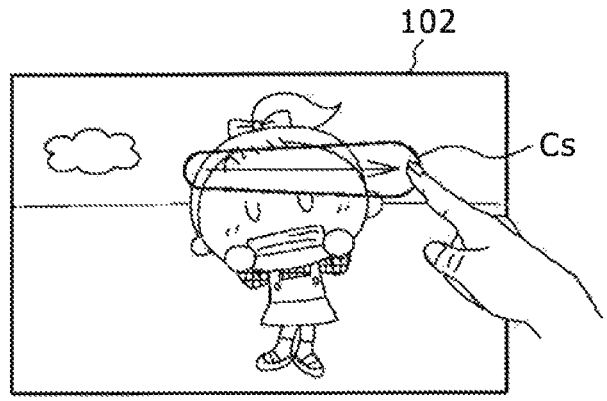
FIGS. 6, 7A to 7C and 8 are a schematic view and diagrammatic views, respectively, illustrating different manners of control of the reproduction speed.

It is assumed that the CPU 110 actually reproduces a dynamic image at a standard speed in the forward direction and causes the dynamic image to be displayed as a horizontally elongated image on the horizontally laid touch screen 102, for example, as seen in FIG. 6.

Here, it is assumed that, for example, dragging in a horizontal direction of the screen is carried out. In this instance, the CPU 110 causes the stretchable cursor Cs, which stretches in the horizontal direction from the start point to the end point of the dragging, to be displayed on the screen in response to the dragging.

Figure 7A:
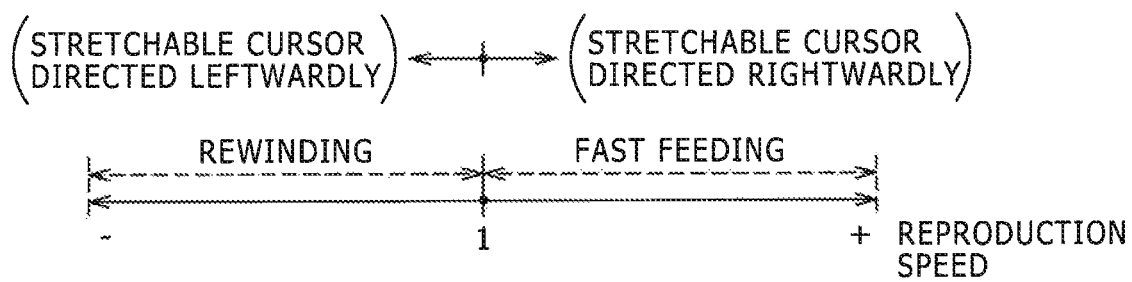

Then, if the stretchable cursor Cs is directed rightwardly as seen in FIG. 7A, then the CPU 110 sets the sign of the reproduction speed to +, that is, sets the reproduction direction to the forward direction, and reproduces the dynamic image at a speed higher than the standard speed, that is, carries out fast feeding of the dynamic image, in the forward direction. On the other hand, if the stretchable cursor Cs is directed leftwardly, then the sign of the reproduction speed to −, that is, sets the reproduction direction to the reverse direction, and reproduces the dynamic image at a speed higher than the standard speed in the reverse direction, that is, carries out rewinding of the dynamic image.

Figure 8:
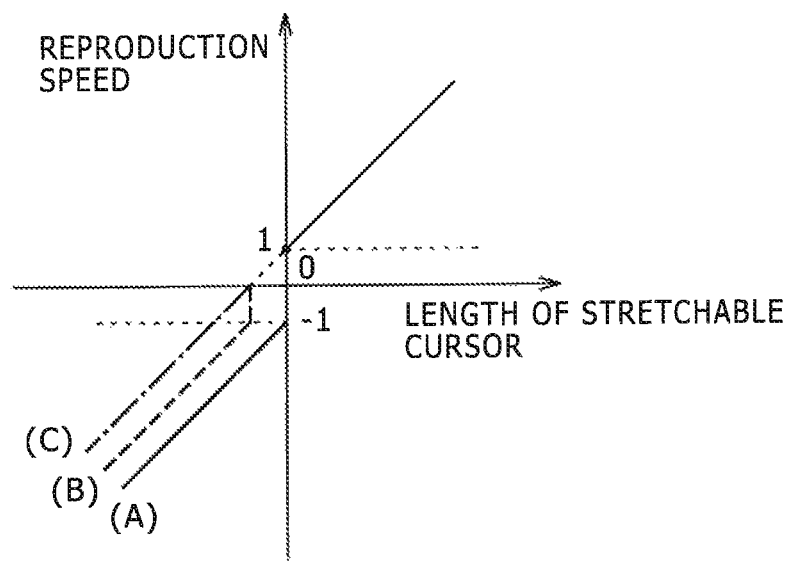

Further, at this time, the CPU 110 sets the value of the reproduction speed to a higher value as the length of the stretchable cursor Cs becomes longer as seen from a graph (A) of FIG. 8. It is to be noted that, in the graphs in FIG. 8 and the succeeding figures, the sign of the length of the stretchable cursor Cs when the stretchable cursor Cs is directed rightwardly or upwardly is set to +, but the sign of the length of the stretchable cursor Cs when the stretchable cursor Cs is directed leftwardly or downwardly is set to −.

In this manner, the portable terminal 100 can carry out fast feeding or rewinding of dynamic images at a predetermined reproduction speed in response to an operation by the stretchable cursor Cs while indicating a start point-end point direction and a start point-end point distance of the dragging to the user by the stretchable cursor Cs.

Thereafter, if the finger is spaced away from the touch screen 102 to end the dragging, then the CPU 110 causes the stretchable cursor Cs to be contracted and erased from the screen. Simultaneously, the CPU 110 reproduces the dynamic image at the standard speed in the forward direction again.

Figure 7B:
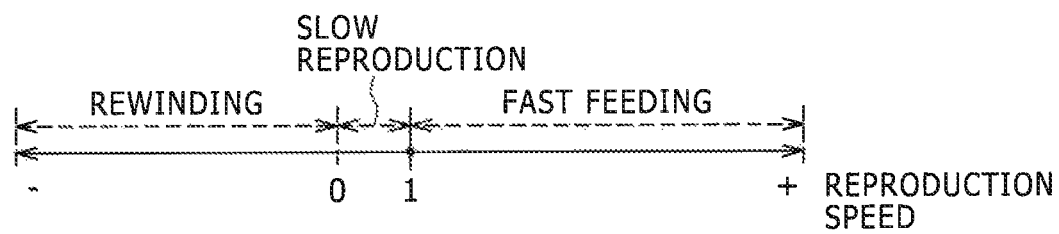

Further, a different reproduction mode in which slow reproduction of dynamic images, that is, reproduction at a speed lower than the standard speed in the forward direction, as seen in FIG. 7B and from a graph (B) of FIG. 8 is carried out in response to an operation input through the stretchable cursor Cs may be provided separately.

In this instance, similarly as in the case described hereinabove with reference to FIG. 7A and a graph (A) of FIG. 8, the CPU 110 reproduces the dynamic images at a speed higher than the standard speed in the forward direction if the stretchable cursor Cs is directed rightwardly, that is, carries out fast feeding. Further, at this time, the CPU 110 sets the reproduction speed to a higher value as the stretchable cursor Cs becomes longer.

On the other hand, if the stretchable cursor Cs is directed leftwardly and the length of the stretchable cursor Cs is smaller than the predetermined value, then the CPU 110 reproduces a dynamic image at a speed lower than the standard speed in the forward direction, that is, carries out slow reproduction. Further, at this time, the CPU 110 sets the reproduction speed to a lower value as the stretchable cursor Cs becomes longer, that is, decreases the reproduction speed of the slow reproduction as the length of the stretchable cursor Cs increases.

On the other hand, if the stretchable cursor Cs is directed leftwardly and the length of the stretchable cursor Cs is greater than the predetermined value, then the CPU 110 reproduces a dynamic image at a speed higher than the standard speed in the reverse direction, that is, carries out rewinding. Further, at this time, the CPU 110 sets the reproduction speed to a higher value as the stretchable cursor Cs becomes longer, that is, increases the reproduction speed of the rewinding as the length of the stretchable cursor Cs increases.

Figure 7C:
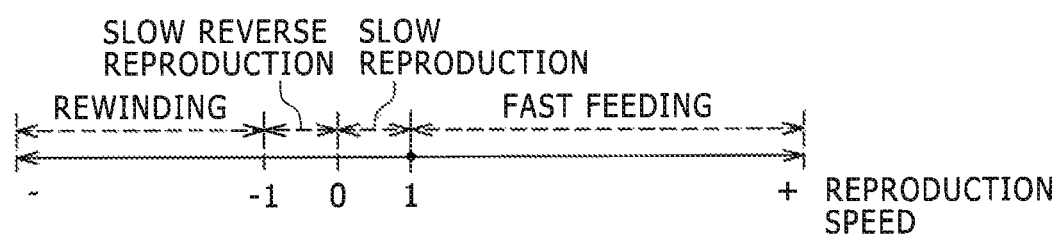

Furthermore, another different reproduction mode in which slow reverse reproduction, that is, reproduction at a speed lower than the standard speed in the reverse direction, as seen in FIG. 7C and from a graph (C) of FIG. 8, is carried out in response to an operation input through the stretchable cursor Cs may be provided separately.

In this instance, similarly as in the case described hereinabove with reference to FIG. 7A and the graph (A) of FIG. 8, if the stretchable cursor Cs is directed rightwardly, then the CPU 110 reproduces a dynamic image at a speed higher than the standard speed in the forward direction, that is, carries out fast feeding. Further, at this time, the CPU 110 sets the reproduction speed to a higher value as the length of the stretchable cursor Cs becomes greater.

On the other hand, similarly as in the case described hereinabove with reference to FIG. 7B and the graph (B) of FIG. 8, when the stretchable cursor Cs is directed leftwardly and the length of the stretchable cursor Cs is smaller than a predetermined first value, the CPU 110 reproduces a dynamic image at a speed lower than the standard speed in the forward direction, that is, carries out slow reproduction. Further, at this time, the CPU 110 sets the reproduction speed to a lower speed, that is, decreases the reproduction speed for slow reproduction, as the length of the stretchable cursor Cs becomes greater.

However, if the stretchable cursor Cs is directed leftwardly and the length of the stretchable cursor Cs is greater than the predetermined first value but smaller than a predetermined second value, then the CPU 110 reproduces a dynamic image at a speed lower than the standard speed in the reverse direction, that is, carries out slow reverse reproduction. Further, at this time, the CPU 110 sets the reproduction speed to a higher value, that is, increases the reproduction speed for slow reverse reproduction, as the length of the stretchable cursor Cs increases.

Further, if the stretchable cursor Cs is directed leftwardly and the length of the stretchable cursor Cs is greater than the predetermined second threshold value, then the CPU 110 reproduces a dynamic image at a speed higher than the standard speed in the reverse direction. Further, at this time, the CPU 110 sets the reproduction speed to a higher value, that is, increases the reproduction speed for rewinding, as the length of the stretchable cursor Cs increases.

Further, in addition to the reproduction modes described, an editing mode for carrying out editing of dynamic images may be provided separately.

In the editing mode, the CPU 110 sets the reproduction speed to "0" in a state in which dragging is not carried out. In other words, a dynamic image is displayed in a temporarily stopping state.

Figure 9:
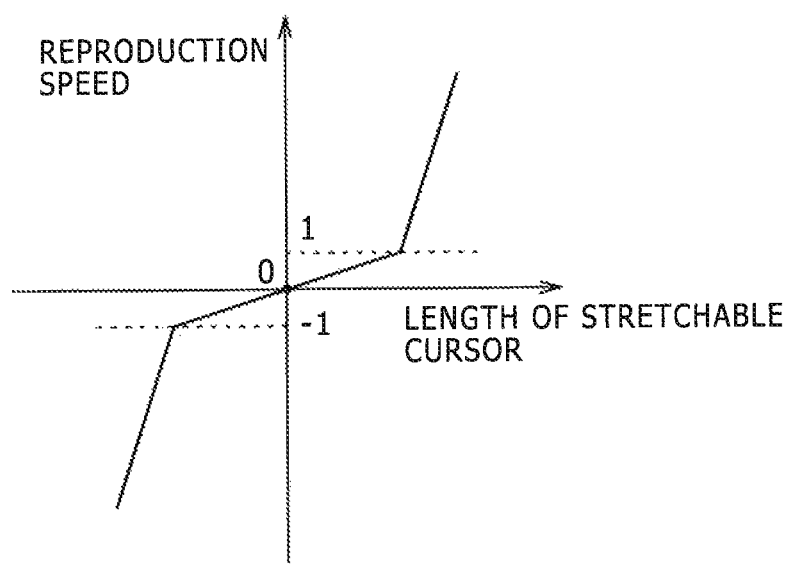
FIG. 9 is a diagrammatic view illustrating control of the reproduction speed in an editing mode.

If dragging is carried out here, then the CPU 110 sets, when the stretchable cursor Cs is directed rightwardly, the sign of the reproduction speed to +, that is, sets the reproduction direction to the forward direction as seen in FIG. 9. Further, the CPU 110 increases the value of the reproduction speed from the value of "0" as the length of the stretchable cursor Cs increases.

On the other hand, if the stretchable cursor Cs is directed leftwardly, then the CPU 110 sets the sign of the reproduction speed to −, that is, sets the reproduction direction to the reverse direction. Further, the CPU 110 increases the value of the reproduction speed from the value of "0" as the length of the stretchable cursor Cs increases.

Further, at this time, when the reproduction speed is lower than the standard speed in the forward direction or the reverse direction, the CPU 110 makes moderate the increasing degree or the decreasing degree of the reproduction speed with respect to the length of the stretchable cursor Cs in comparison with that when the reproduction speed is higher than the standard speed in the forward direction or the reverse direction.

Thus, in the present editing mode, while a dynamic image is reproduced by slow reproduction or slow reverse reproduction, the reproduction speed can be adjusted more finely.

If the finger is thereafter spaced away from the touch screen 102 to end the dragging, then the CPU 110 contracts the stretchable cursor Cs until it disappears from the screen. Simultaneously, the CPU 110 sets the reproduction speed of a dynamic image to "0," that is, displays a dynamic image in a state in which it stops temporarily.

In this manner, the CPU 110 controls the reproduction speed of a dynamic image in response to an operation input through the stretchable cursor Cs.

Further, the CPU 110 controls the scroll speed, for example, of various lists, dynamic images and so forth in response to an operation input through the stretchable cursor Cs.

More particularly, the CPU 110 controls the sign of the scroll speed, that is, the scroll direction, in response to the direction of the stretchable cursor Cs and controls the value of the scroll speed in response to the length of the stretchable cursor Cs.

Figure 10A:
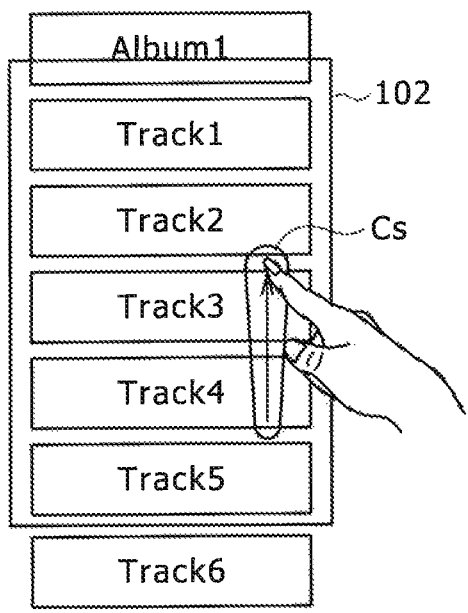
FIGS. 10A, 10B and 10C are schematic views and a diagrammatic view, respectively, illustrating control of the scroll speed.

For example, it is assumed that a list in which titles of tunes or tracks are arranged in a vertical column is displayed on the touch screen 102 directed vertically as seen in FIG. 10A. The list described is hereinafter referred to also as track list.

Here, if dragging in a vertical direction of the screen is carried out, then the CPU 110 causes the stretchable cursor Cs, which stretches in the vertical direction from a start point to an end point of the dragging to be displayed on the screen in response to the dragging.

Then, if the stretchable cursor Cs is directed upwardly, then the CPU 110 sets the sign of the scroll speed to + and sets the scroll direction to a direction in which the track list is scrolled downwardly from above. On the other hand, if the stretchable cursor Cs is directed downwardly, then the CPU 110 sets the sign of the scroll speed to − and sets the scroll direction to a direction in which the track list is scrolled upwardly from below.

Figure 10B:
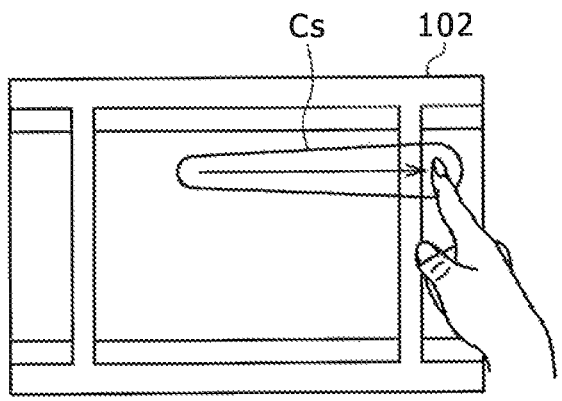
Figure 10C:
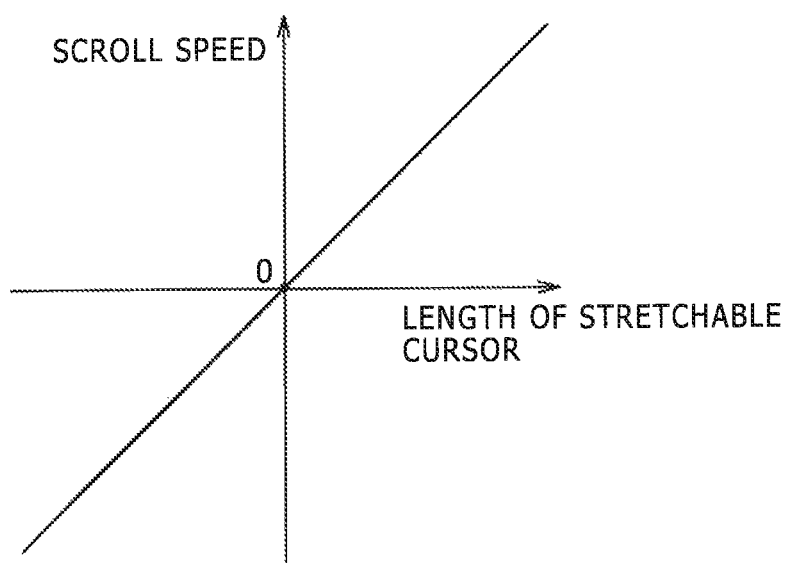

Further, the CPU 110 sets the scroll speed to a higher value as the length of the stretchable cursor Cs becomes longer as seen in FIG. 10C.

On the other hand, it is assumed that, for example, a list in which a plurality of still images are arranged in a horizontal row is displayed on the touch screen 102 disposed horizontally as seen in FIG. 10B.

Here, if dragging in a horizontal direction of the screen is carried out, then the CPU 110 causes, in response to the dragging, the stretchable cursor Cs, which stretches in the horizontal direction from a start point to an end point of the dragging to be displayed on the screen.

Then, if the stretchable cursor Cs is directed rightwardly, then the CPU 110 sets the sign of the scroll speed to + and sets the scroll direction to a direction in which a still picture is scrolled from the right to the left. Meanwhile, if the stretchable cursor Cs is directed leftwardly, then the CPU 110 sets the sign of the scroll speed to − and sets the scroll direction to a direction in which the still picture is scrolled from the left to the right.

Further, the CPU 110 sets the scroll speed to a higher value as the length of the stretchable cursor Cs becomes greater as seen in FIG. 10C.

In this manner, while the portable terminal 100 indicates a start point-end point direction and a start point-end point distance of the dragging to the user, it can scroll various lists or images at a desired speed in a desired direction in response to an operation input through the stretchable cursor Cs.

It is to be noted that, after the dragging comes to an end, the CPU 110 moves the end point side toward the start point side of the stretchable cursor Cs to contract the stretched stretchable cursor Cs until it comes to exhibit a circular shape and then erases the stretchable cursor Cs from the screen, thereby ending the scrolling.

Further, the CPU 110 controls the adjustment speed of various parameters such as, for example, the sound volume, zoom ratio, luminance or saturation of an image, and so forth in response to an operation input through the stretchable cursor Cs.

In particular, the CPU 110 controls the sign of the adjustment speed of a parameter, that is, the adjustment direction, in response to the direction of the stretchable cursor Cs and controls the value of the adjustment speed in response to the length of the stretchable cursor Cs.

Figure 11A:
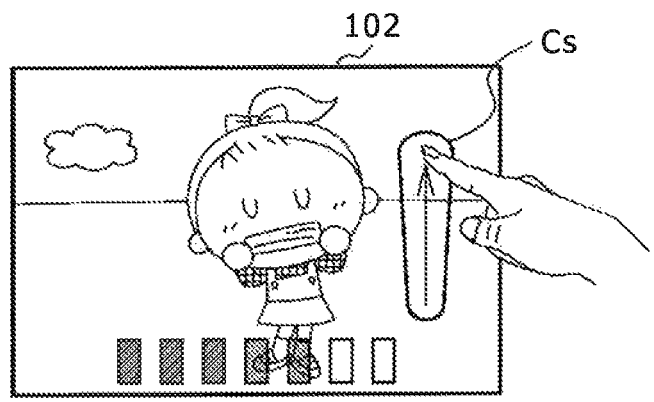
FIGS. 11A and 11B are a schematic view and a diagrammatic view, respectively, illustrating control of the adjustment speed of a parameter.

For example, it is assumed that a horizontally elongated dynamic image is displayed on the horizontally elongated touch screen 102 as seen in FIG. 11A.

Here, if dragging in a vertical direction of the screen is carried out, then the CPU 110 causes the stretchable cursor Cs, which stretches from an end point to an end point of the dragging, to be displayed on the screen in response to the dragging.

Then, if the stretchable cursor Cs is directed upwardly, then the CPU 110 sets the sign of the adjustment speed of the sound volume to + and sets the adjustment direction to an increasing direction of the sound volume. On the other hand, if the stretchable cursor Cs is directed downwardly, then the CPU 110 sets the sign of the adjustment speed of the sound volume to − and sets the adjustment direction to a decreasing direction of the sound volume.

Figure 11B:
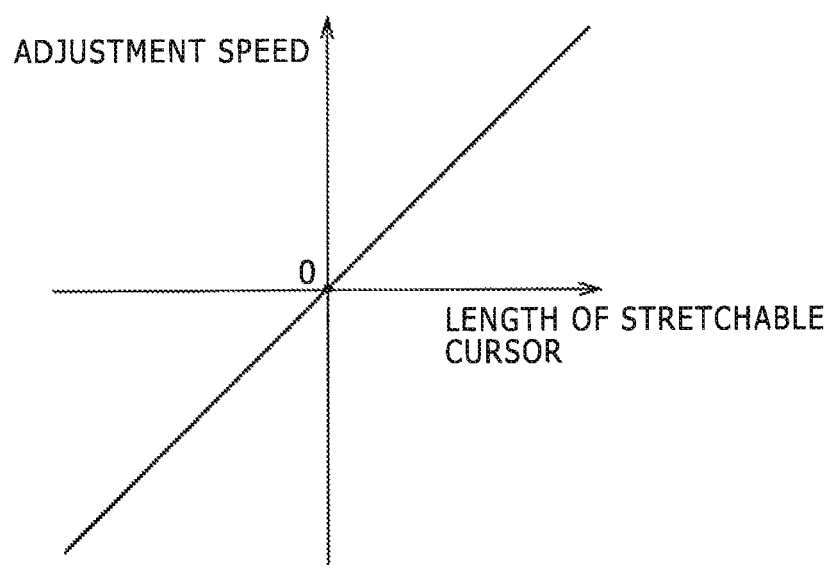

Further, the CPU 110 sets the value of the adjustment speed of the sound volume to a higher value as the length of the stretchable cursor Cs at this time becomes greater as seen in FIG. 11B.

It is to be noted that, after the dragging comes to an end, the CPU 110 contracts the stretchable cursor Cs until it is erased from the screen, thereby ending the adjustment of the sound volume. Thereafter, the sound volume at the time immediately before the dragging comes to an end is maintained.

In this manner, while the portable terminal 100 indicates a start point-end point direction and a start point-end point distance of dragging by the stretchable cursor Cs and can increase or decrease the sound volume, which is a parameter of sound annexed to a dynamic image at a desired adjustment speed to adjust the sound volume in response to an operation input through the stretchable cursor Cs.

As described above, if dragging is carried out, then the portable terminal 100 causes a stretchable cursor Cs, which indicates a start point and end point positions, a start point-end point direction and a start point-end point distance of the dragging, to be displayed. Then, the portable terminal 100 accepts various operation inputs in response to the direction and the length of the stretchable cursor Cs.

2-3-2. Example of an Operation Input in Various Applications

Now, an operation input through the stretchable cursor Cs described hereinabove is described in more detail taking an operation input in an application installed in the portable terminal 100 as an example.

It is to be noted that, while various applications can be installed into the portable terminal 100, it is assumed here that, as an example, an application for reproducing music, another application for reproducing a still image and a further application for reproducing a dynamic image are installed.

First, an operation input through the stretchable cursor Cs in the application for reproducing a dynamic image is described in detail.

If, in a state in which an icon corresponding to startup of the dynamic image reproduction application is displayed on the touch screen 102, the icon is tapped, then the CPU 110 accepts the touch operation as an operation input for starting up the dynamic image reproduction application.

Then, the CPU 110 reads out a program of the dynamic image reproduction application from the nonvolatile memory 111 and executes the program to start up the dynamic image reproduction application.

After the dynamic image reproduction application is started up, the CPU 110 causes thumbnail images of dynamic images stored as dynamic image files in the nonvolatile memory 111 to be displayed in a table on the touch screen 102.

Further, if one of the thumbnail images displayed in a list is tapped, then the CPU 110 accepts the touch operation as an operation input for reproduction a dynamic image.

Then, the CPU 110 obtains a dynamic image from a dynamic image file corresponding to the tapped thumbnail image.

Figure 12:
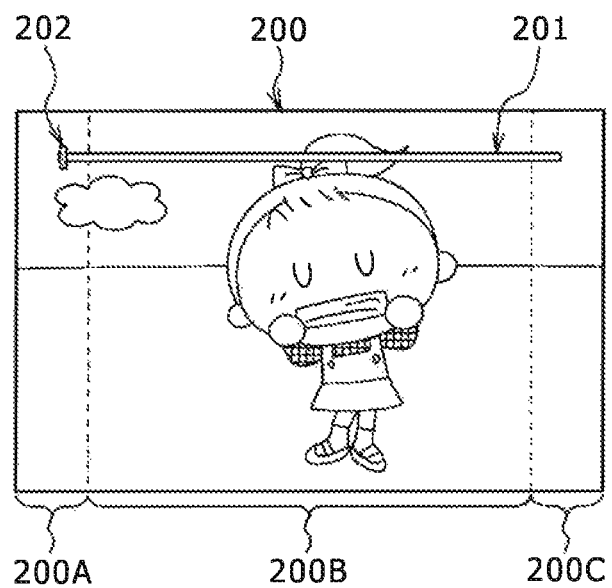
FIG. 12 is a schematic view showing a configuration of a dynamic image reproduction screen image.

Further, at this time, the CPU 110 causes a dynamic image reproduction screen image 200 shown in FIG. 12 to be displayed on the touch screen 102. It is to be noted that the dynamic image reproduction screen image 200 is a horizontally elongated screen image and is displayed over the overall area of the horizontally elongated touch screen 102 assuming use thereof in a horizontally directed state.

On the dynamic image reproduction screen image 200, a dynamic image is displayed substantially over the overall area thereof. Further, on the dynamic image reproduction screen image 200, in the proximity of the upper end, a bar 201 extending from a left end to a right end of the screen image is displayed in an overlapping relationship with the dynamic image. This bar 201 indicates, at one end thereof on the left side in the screen image, the top of a dynamic image and, at the other end thereof on the right side in the screen image, the tail end of the dynamic image. The bar 201 indicates a reproduction position at present of the dynamic image by means of a pointer 202 which moves on the bar 201. The bar 201 is hereinafter referred to as reproduction bar 201.

Further, the dynamic image reproduction screen image 200 is divided in a horizontal direction into three portions including a left end region 200A, a central region 200B and a right end region 200C. Each of the left end region 200A and the right end region 200C has a size, for example, equal to substantially ⅙ that of the entire screen image, and the central region 200B has a size of the remaining substantially ⅘ that of the entire screen image. The roll of the left end region 200A, central region 200B and right end region 200C is hereinafter described.

The CPU 110 successively displays reproduced dynamic images in the forward direction at the standard speed beginning with the top chapter on the dynamic image reproduction screen image 200. It is to be noted that reproduction at the standard speed in the forward direction is hereinafter referred to as normal reproduction.

Further, one dynamic image is partitioned for each predetermined unit such as for each scene, and here, a partial dynamic image for each unit is referred to as chapter. In other words, one dynamic image is configured from a plurality of chapters.

Here, in the dynamic image reproduction screen image 200, reproduction of a dynamic image can be controlled by dragging in a horizontal direction.

It is assumed that dragging in a horizontal direction of the screen is carried out actually as seen in FIG. 13A. In this instance, the CPU 110 causes the stretchable cursor Cs stretched in the horizontal direction from a start point to an end point of the dragging to be displayed on the screen in response to the dragging. It is to be noted that the stretchable cursor Cs continues to be displayed until after the finger is spaced away from the touch screen 102 to end the dragging.

Here, the CPU 110 recognizes that the direction of the stretchable cursor Cs displayed is the horizontal direction, and then decides whether or not the end point of the stretchable cursor Cs, that is, the end point of the dragging, is within the central region 200B of the screen. Here, if the end point of the stretchable cursor Cs is within the central region 200B, then the CPU 110 controls the reproduction speed of a dynamic image displayed on the screen, that is, of a chapter, that is, a reproduction direction and a value of a reproduction speed, in response to the direction and the length of the stretchable cursor Cs.

In particular, if the stretchable cursor Cs displayed is directed rightwardly, then the CPU 110 sets the sign of the reproduction speed to + thereby to set the reproduction speed to the forward direction. On the other hand, if the stretchable cursor Cs displayed is directed leftwardly, then the CPU 110 sets the sign of the reproduction speed to − thereby to set the reproduction speed to the reverse direction. Furthermore, as the length of the stretchable cursor Cs at this time increases, the value of the reproduction speed is set to a higher value.

As a result, for example, if the stretchable cursor Cs is stretched long rightwardly by dragging in the rightward direction of the screen, then the dynamic image displayed on the dynamic image reproduction screen image 200 is reproduced fast in the forward direction, that is, fast feeding is carried out.

On the other hand, if the stretchable cursor Cs is stretched short leftwardly by dragging in the leftward direction of the screen, then the dynamic image displayed on the dynamic image reproduction screen image 200 is reproduced slowly in the reverse direction, that is, rewinding is carried out.

Further, if, after such dragging in the rightward direction of the screen as described above, the finger is not spaced away from the touch screen 102 nor is moved, then the stretchable cursor Cs continues to be displayed without changing the direction and the length thereof and the reproduction speed then, that is, the reproduction direction and the value of the reproduction speed, is maintained.

In this manner, the dynamic image reproduction screen image 200 indicates a start point-end point direction and a start point-end point distance to the user by means of the stretchable cursor Cs and can reproduce a dynamic image at a desired reproduction speed in a desired reproduction direction in response to an operation input through the stretchable cursor Cs.

It is to be noted here that, although description of sound annexed to a dynamic image is omitted hereinabove, reproduction also of sound is controlled by dragging similarly to a dynamic image.

Further, it is assumed that dragging is continued until the end point of the stretchable cursor Cs goes out of the central region 200B of the screen, or in other words, enters the left end region 200A or the right end region 200C, for example, as seen in FIG. 13B.

Consequently, the CPU 110 transits the display substance of the dynamic image reproduction screen image 200 from a chapter to a list of chapters, which is hereinafter referred to also as chapter list.

The chapter list is a list in which representative still pictures, hereinafter referred to also as chapter images, extracted from chapters are arranged in a horizontal row in an order of reproduction time.

Here, since the chapter list is a list of representative chapter images extracted from chapters, it can be considered as information of a higher hierarchy with respect to the chapter.

At this time, the CPU 110 transits the display substance of the dynamic image reproduction screen image 200 from a chapter to a chapter list which is information of a higher hierarchy.

In particular, as shown in FIG. 13C, the CPU 110 zooms out a chapter being displayed and causes part of a chapter list, which includes a chapter image Cp(N) of a chapter reproduced immediately prior to the transition, to be displayed on the dynamic image reproduction screen image 200.

Actually, FIG. 13C illustrates an example wherein a chapter image Cp(N) is displayed at the center of the dynamic image reproduction screen image 200 and part of the preceding chapter image Cp(N−1) is displayed on the left side of the chapter image Cp(N) while part of the next chapter image Cp(N+1) is displayed on the right side of the chapter image Cp(N).

In this manner, when transition from a chapter to a chapter list is carried out, the dynamic image reproduction screen image 200 displays the chapter list such that the chapter image Cp(N) displayed immediately prior to the transition is positioned at the center of the screen.

Consequently, on the dynamic image reproduction screen image 200, transition from a chapter to a chapter list can be carried out seamlessly without giving an uncomfortable feeling to the user.

Further, at this time, the stretchable cursor Cs continues to be displayed on the dynamic image reproduction screen image 200 until the finger is spaced away from the touch screen 102 thereby to end the dragging irrespective of such transition of the display substance.

In particular, on the dynamic image reproduction screen image 200 at this time, the stretchable cursor Cs which stretches from within the central region 2008B to the outside of the central region 200B in the horizontal direction, that is, to the inside of the left end region 200A or the right end region 200C, is displayed.

Here, the CPU 110 controls the scroll speed, that is, the scroll direction and the value of the scroll speed, of the chapter list displayed on the screen in response to the direction and the length of the stretchable cursor Cs to scroll the chapter list.

In particular, if the stretchable cursor Cs displayed is directed rightwardly, then the CPU 110 sets the scroll direction of the chapter list to the leftward direction, that is, to a direction in which the chapter image Cp moves leftwardly. On the other hand, if the stretchable cursor Cs displayed is directed leftwardly, then the CPU 110 sets the scroll direction of the chapter list to the rightward direction, that is, to a direction in which the chapter image Cp moves rightwardly. Further, at this time, the scroll speed is set to a higher value as the length of the stretchable cursor Cs at this time becomes greater.

As a result, for example, if the stretchable cursor Cs is stretched long rightwardly by the dragging in the rightward direction of the screen, then the chapter list displayed on the dynamic image reproduction screen image 200 is scrolled at a high speed in the leftward direction.

On the other hand, if the stretchable cursor Cs is stretched short rightwardly by the dragging in the leftward direction of the screen, then the chapter list displayed on the dynamic image reproduction screen image 200 is scrolled slowly in the rightward direction.

Further, after such dragging in the horizontal direction of the screen, if the finger is not spaced away from or moved on the touch screen 102, then the stretchable cursor Cs continues to be displayed without changing the direction and the length of the stretchable cursor Cs. Then, the scroll speed, that is, the scroll direction and the value of the scroll speed, at this time is maintained.

In this manner, on the dynamic image reproduction screen image 200, if the end point of the stretchable cursor Cs enters the left end region 200A or the right end region 200C, then the display substance transits from a chapter to a chapter list.

Then at this time, the dynamic image reproduction screen image 200 indicates a start point-end point direction and a start point-end point distance to the user by means of the stretchable cursor Cs and can scroll the chapter list at a desired scroll speed in response to an operation input through the stretchable cursor Cs.

Consequently, the user can readily search a chapter image Cp of a desired chapter from the chapter list through the dynamic image reproduction screen image 200.

Here, it is decided that, when an arbitrary chapter image Cp is displayed at the center of the dynamic image reproduction screen image 200, dragging is ended, that is, the finger is spaced away from the touch screen 102.

Consequently, the CPU 110 moves the end point side of the stretchable cursor Cs toward the start point of the stretchable cursor Cs so that the stretchable cursor Cs stretched in the horizontal direction is contracted until it becomes circular as seen in FIG. 13D and erases the stretchable cursor Cs from the screen.

Further, at this time, the CPU 110 transits the display substance of the dynamic image reproduction screen image 200 from a chapter list to a chapter which is information of a lower hierarchy.

In particular, the CPU 110 zooms in the displayed chapter list such that the chapter corresponding to the chapter image Cp displayed at the center of the screen immediately prior to the transition is reproduced normally from the top thereof and is displayed on the dynamic image reproduction screen image 200.

In this manner, when transition from a chapter list to a chapter is carried out, reproduction is started beginning with the chapter corresponding to the chapter image Cp which was displayed at the center of the screen immediately prior to the transition.

Consequently, on the dynamic image reproduction screen image 200, seamless transition from a chapter list to a chapter can be carried out without giving an uncomfortable feeling to the user at all. Further, a series of operations from search of a chapter to reproduction of the chapter can be carried out simply only by a single time of dragging.

It is to be noted that it is assumed that, after the transition to the chapter list, the dragging is continued with the finger kept touching and the end point of the stretchable cursor Cs returns into the central region 200B from the outside of the central region 200B.

Also in this instance, if the display substance at present is a chapter list, then the CPU 110 continues to control the scroll speed of the chapter list in response to the direction and the length of the stretchable cursor Cs.

As described hereinabove, in the dynamic image reproduction application, the stretchable cursor Cs directed horizontally is displayed on the dynamic image reproduction screen image 200 in response to dragging in a horizontal direction. Then, in the dynamic image reproduction application, if the end point of the stretchable cursor Cs being displayed remains in the central region 200B, then the reproduction direction and the value of the reproduction speed of the chapter are set in response to the direction, that is, the leftward or rightward direction, and the length of the stretchable cursor Cs.

In this manner, in the dynamic image reproduction application, it is possible to freely set a reproduction direction and a value of a reproduction speed of a chapter and reproduce a chapter only by an operation input through the stretchable cursor Cs.

Further, in the dynamic image reproduction application, if the end point of the stretchable cursor Cs enters the left end region 200A or the right end region 200C in response to dragging, then the display substance is transited from a chapter to a chapter list which is information of a higher hierarchy.

At this time, in the dynamic image reproduction application, the scroll direction and the value of the scroll speed of the chapter list are set in response to the direction and the length of the stretchable cursor Cs.

Thereafter, when the dragging comes to an end, in the present dynamic image reproduction application, the display substance is transited from a chapter list back to a chapter which is information of a lower hierarchy. Then, reproduction of the chapter is started beginning with the top thereof.

In this manner, in the present dynamic image reproduction application, only by an operation input through the stretchable cursor Cs by dragging in a horizontal direction, it is possible to carry out changeover between a chapter and a chapter list or scroll a chapter list at a desired scroll speed.

Further, on the present dynamic image reproduction screen image 200, the sound volume which is a parameter of sound annexed to a dynamic image can be adjusted by dragging in a vertical direction.

Figure 14A:
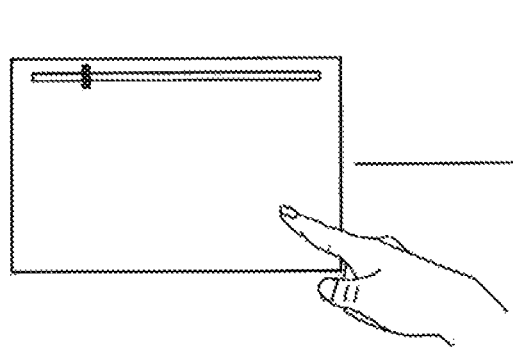
FIGS. 14A and 14B are schematic views illustrating another example of an operation input through the stretchable cursor in the dynamic image reproduction application.
Figure 14B:
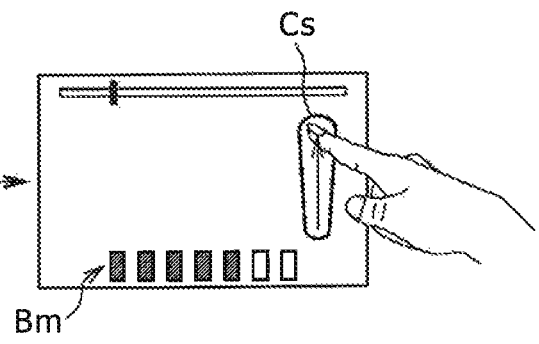

It is assumed here that dragging in a vertical direction of the screen is carried out actually as seen in FIGS. 14A and 14B. In this instance, the CPU 110 causes a stretchable cursor Cs, which is stretched from a start point to an end point of the dragging, to be displayed on the screen in response to the dragging.

Here, if the CPU 110 recognizes that the stretchable cursor Cs displayed is directed vertically, then it controls the adjustment speed of the sound volume, that is, the adjustment direction and the value of the adjustment speed, to increase or decrease the sound volume in response to the direction and the length of the stretchable cursor Cs at this time.

In particular, if the stretchable cursor Cs displayed is directed upwardly, then the CPU 110 sets the sign of the adjustment speed to + thereby to set the adjustment direction of the sound volume to a direction in which the sound volume increases. On the other hand, if the stretchable cursor Cs displayed is directed downwardly, then the CPU 110 sets the sign of the adjustment speed to − thereby to set the adjustment speed of the sound volume to a direction in which the sound volume decreases. Further, the adjustment speed of the sound volume is set to a higher value as the length of the stretchable cursor Cs at this time becomes greater.

As a result, for example, if the stretchable cursor Cs stretches long upwardly by dragging in the upward direction of the screen, then the sound volume increases at once.

On the other hand, for example, if the stretchable cursor Cs stretches short downwardly by dragging in the downward direction of the screen, then the sound volume decreases slowly.

Further, for example, if the finger is not displaced from nor moved on the touch screen 102 after such dragging in the vertical direction of the screen, then the stretchable cursor Cs continues to be displayed without changing the direction and the length thereof and the adjustment speed, that is, the adjustment direction and the value of the adjustment speed, is maintained.

In this manner, while the dynamic image reproduction screen image 200 allows the user to recognize the direction and the length of dragging by the stretchable cursor Cs, the sound volume can be adjusted at a desired adjustment speed in accordance with the direction and the length of the dragging.

Further, the CPU 110 at this time causes a sound volume bar Bm representative of the sound volume at present to be displayed at a predetermined position such as, for example, a lower portion of a mid portion of the screen. Consequently, the user can visually observe the sound volume bar Bm to confirm the sound volume at present and adjust the sound volume.

Thereafter, when the dragging comes to an end, the CPU 110 moves the end point side of the stretchable cursor Cs toward the start point side of the stretchable cursor Cs to contract the stretchable cursor Cs stretched in the vertical direction until it becomes circular and then erases the stretchable cursor Cs from the screen, thereby ending the adjustment of the sound volume. Thereafter, the sound volume at time immediately preceding to the end of the dragging is maintained.

As described hereinabove, in the dynamic image reproduction application, a stretchable cursor Cs directed vertically is displayed on the dynamic image reproduction screen image 200 in response to dragging in the vertical direction. Then, in the present dynamic image reproduction application, the adjustment direction and the value of the adjustment speed of the sound volume are set in response to the direction, that is, the upward or downward direction, and the length of the stretchable cursor Cs displayed.

In this manner, in the dynamic image reproduction application, the sound volume can be adjusted while the adjustment direction and the value of the adjustment speed are changed freely only by an operation input through the stretchable cursor Cs upon dragging in a vertical direction.

Further, in the present dynamic image reproduction application, if dragging in a vertical direction is carried out, then at whichever position on the screen the dragging is carried out, the sound volume can be adjusted. Therefore, while the user watches a dynamic image, the user can carry out dragging at a portion of the screen at which the dynamic image is not very significant thereby to adjust the sound volume.

Further, for example, in such a case that only sound of a dynamic image is to be enjoyed, even it can be carried out readily to adjust the sound volume by touch typing without gazing into the screen.

Now, an operation input through the stretchable cursor Cs in the application for reproducing a tune or track is described in detail. It is to be noted that the application just mentioned is hereinafter referred to as tune reproduction application.

If, in a state in which an icon corresponding to startup of the tune reproduction application is displayed on the touch screen 102, the icon is tapped, then the CPU 110 accepts the touch operation as an operation input for starting up the tune reproduction application.

Then, the CPU 110 reads out the program of the tune reproduction application from the nonvolatile memory 111 and executes the program to start up the tune reproduction application.

Figure 15:
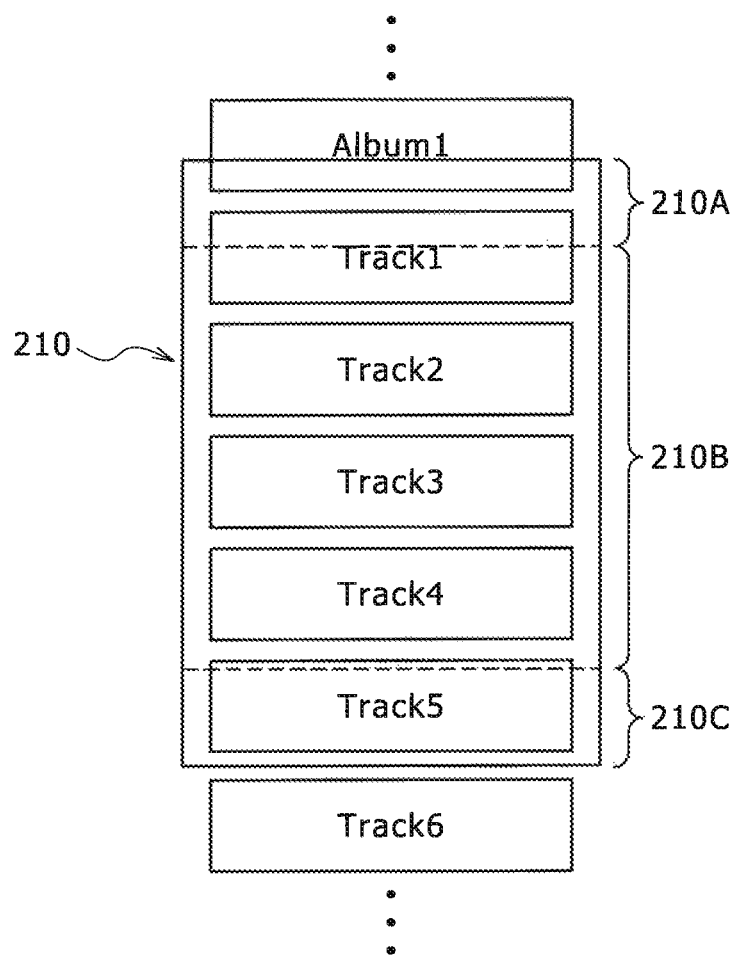
FIG. 15 is a schematic view showing a configuration of a track selection screen image.

After the tune reproduction application is started up, then the CPU 110 causes a track selection screen image 210 shown in FIG. 15 to be displayed on the touch screen 102.

It is to be noted that the track selection screen image 210 is a vertically elongated screen image and is displayed over the overall area of the vertically elongated touch screen 102 assuming use thereof in a vertically directed state.

This track selection screen image 210 is divided in a vertical direction into three portions including an upper end region 210A, a central region 210B and a lower end region 210C. Here, each of the upper end region 210A and the lower end region 210C has a size, for example, equal to approximately ⅙ that of the entire screen, and the central region 210B has a size of the remaining approximately ⅔ that the entire screen. The roll of the upper end region 210A, central region 210B and lower end region 210C is hereinafter described.

The CPU 110 causes a track list to be displayed on such a track selection screen image 210 as described above. This track list is a list in which the titles of tracks or tunes stored as music files in the nonvolatile memory 11*l* are arranged in a vertical column, for example, based on the titles and track numbers of recorded albums.

In particular, this track list is a list in which tracks are collected for individual albums arranged in the order of the title and are arranged in the order of the track number.

It is to be noted that, in this track list, in addition to the title of the track, the title of each album is inserted in front of, in FIG. 14, above, the title of the top track of each album.

In particular, in the present track list, the titles are arranged like the title of the album 1, the title of the track number 1 of the album 1, . . . , the title of the track number 5, the title of the album 2, the title of the track number 1 of the album 2, . . . .

On the track selection screen image 210, at least part of the track list is displayed. FIG. 15 shows an example in which the titles of five tracks from among the titles included in the track list are actually displayed on the track selection screen image 210.

Here, on the track selection screen image 210, the scroll speed, that is, the scroll direction and the value of the scroll speed, of the track list can be controlled by dragging in a vertical direction.

It is assumed that dragging in a horizontal direction of the screen is carried out actually as seen in FIG. 16A. In this instance, the CPU 110 causes the stretchable cursor Cs, which stretches in a vertical direction from a start point to an end point of the dragging, to be displayed on the screen in response to the dragging. It is to be noted that this stretchable cursor Cs continues to be displayed until the finger is spaced away from the touch screen 102 to end the dragging.

Here, if the CPU 110 recognizes that the stretchable cursor Cs displayed is directed vertically, then it first decides whether or not the end point of the stretchable cursor Cs, that is, the end point of the dragging, is within the central region 210B of the screen. Here, if the end point of the stretchable cursor Cs is within the central region 210B, then the CPU 110 controls the scroll speed of the track list to scroll the track list in response to the direction and the length of the stretchable cursor Cs.

In particular, if the direction of the stretchable cursor Cs displayed is directed upwardly, then the CPU 110 sets the scroll direction of the track list in the upward direction, or in other words, in a direction in which the titles move downwardly. On the other hand, if the stretchable cursor Cs displayed is directed downwardly, then the CPU 110 sets the scroll direction on the track list to a downward direction, that is, to a direction in which the titles move upwardly. Further, the scroll speed is set to a higher value as the length of the stretchable cursor Cs at this time becomes greater.

As a result, for example, if the stretchable cursor Cs is stretched long upwardly by the dragging in the upward direction of the screen, then the track list displayed on the track selection screen image 210 is scrolled at a high speed in the downward direction.

On the other hand, for example, if the stretchable cursor Cs is stretched short downwardly by the dragging in the upward direction of the screen, then the track list displayed on the track selection screen image 210 scrolls slowly in the upward direction.

Furthermore, if the finger is not spaced away from nor moved on the touch screen 102 after such dragging in the vertical direction of the screen, then the stretchable cursor Cs continues to be displayed without changing the direction and the length thereof. Further, the scroll speed at this time, that is, the scroll direction and the value of the scroll speed, is maintained.

In this manner, while the track selection screen image 210 indicates the start point-end point direction and the start point-end point distance of the dragging to the user by means of the stretchable cursor Cs, the track list can be scrolled at a desired scroll speed in response to an operation input through the stretchable cursor Cs.

Consequently, the user can readily search out the title of a described track from within the track list.

Further, the CPU 110 gradually decreases the display size only of the title of the track from among the titles included in the track list as the end point of the stretchable cursor Cs approaches to the inside of the upper end region 210A or the lower end region 210C as seen in FIG. 16B.

In this manner, as the display size of the title of the track gradually decreases, the display distance between the titles of the albums included in the track list gradually decreases in such a manner that bellows contract themselves.

Then, it is assumed that the end point of the stretchable cursor Cs enters into the inside of the upper end region 210A or the lower end region 210C. Then, the CPU 110 erases the title of the track finally from the screen and transits the display substance to a list which includes only the titles of the album of the track list as seen in FIG. 16C. This list is hereinafter referred to also as album list.

It is to be noted that, since the album list is a list of titles of albums which is a higher hierarchy with respect to the title of the track, it is information of the higher hierarchy with respect to the track list.

In particular, at this time, the CPU 110 transits the display substance of the track selection screen image 210 from the track list to an album list which is information of a higher hierarchy with respect to the track list.

In this manner, by gradually reducing the display size only of the title of the track from among the titles included in the track list until the title is erased from the screen, the display substance of the screen is transited from the track list to the album list.

Consequently, the track selection screen image 210 can carry out seamless transition from a track list to an album list without providing any uncomfortable feeling to the user.

Further, at this time, the stretchable cursor Cs continues to be displayed on the track selection screen image 210 until the dragging comes to an end irrespective of such transition of the display substance.

In particular, on the track selection screen image 210 at this time, a stretchable cursor Cs which stretches in a vertical direction from the inside of the central region 210B to the outside of the central region 210B, that is, to the upper end region 210A or the lower end region 210C, is displayed.

Here, while the length of the stretchable cursor Cs displayed exceeds a predetermined threshold value, the CPU 110 controls the scroll speed of the album list displayed on the screen so that the album list is scrolled in response to the direction and the length of the stretchable cursor Cs.

In particular, if the stretchable cursor Cs displayed is directed upwardly, then the CPU 110 sets the strolling direction of the album list to the upward direction, that is, to a direction in which the titles move downwardly. On the other hand, if the stretchable cursor Cs displayed is directed downwardly, then the CPU 110 sets the scroll direction of the album list to the downward direction, that is, to a direction in which the titles move upwardly. Further, the scroll speed is set to a higher value as the length of the stretchable cursor Cs at this time becomes greater.

As a result, for example, if the stretchable cursor Cs is stretched long upwardly by dragging in the upward direction of the screen, then the album list displayed on the track selection screen image 210 is scrolled at a high speed in the downward direction.

Or, for example, if the stretchable cursor Cs is stretched short downwardly by the dragging in the downward direction of the screen, then the album list displayed on the track selection screen image 210 is scrolled slowly in the upward direction.

Further, if the finger is not spaced away from nor moved on the touch screen 102 after such dragging in the vertical direction of the screen, then the stretchable cursor Cs continues to be displayed without changing the direction and the length thereof. Further, the scroll speed, that is, the scroll direction and the value of the scroll speed, at this time is maintained.

In this manner, while the track selection screen image 210 indicates a start point-end point direction and a start point-end point distance of the dragging by the stretchable cursor Cs, the album list can be scrolled at a desired scroll speed in response to an operation input through the stretchable cursor Cs.

Consequently, the user can readily search out the title of a desired album from within the album list.

It is assumed here that, as shown in FIG. 16D, the dragging is further continued until the end point of the dragging comes close to the start point of the dragging and the length of the stretchable cursor Cs becomes smaller than a predetermined threshold value.

Consequently, the CPU 110 transits the display substance of the track selection screen image 210 from the album list to a track list which is information of a lower hierarchy.

In particular, the CPU 110 inserts and displays the title of a track between the titles of an album and another album included in the album list to transit the display substance from the album list to the track list. It is to be noted that the display size of the titles of the tracks in this instance is assumed to be equal to the display size at time immediately prior to the transition from the track list to the album list.

Then, the CPU 110 gradually increases the display size of the titles of the tracks as the length of the stretchable cursor Cs decreases until the display size restores the original size.

In this manner, as the display size of the titles of the tracks gradually increases in this manner, the display distance between the titles of the albums included in the track list gradually increases similarly as upon extension of bellows.

By inserting the titles of tracks between titles of albums included in an album list and gradually returning the display size to its original size, the display substance is transited from a track list to an album list.

Consequently, on the track selection screen image 210, seamless transition from an album list to a track list can be carried out without giving any uncomfortable feeling to the user.

Thus, the user can smoothly carry out searching from a search of an album to a search of a track only by dragging in a vertical direction.

It is assumed that the dragging comes to an end thereafter, that is, the finger is spaced away from the touch screen 102.

In this instance, the CPU 110 moves the end point side of the stretchable cursor Cs toward the start point side of the stretchable cursor Cs to contract the stretchable cursor Cs stretched in the vertical direction until it has a circular shape and then erases the stretchable cursor Cs from the screen.

Further, at this time, the CPU 110 returns the display size of the titles of the tracks included in the track list to the original size. It is to be noted that, if the album list remains displayed when the dragging comes to an end, then the CPU 110 inserts the titles of the tracks into the album list to transit the display substance to the track list.

Here, it is assumed that one of the titles of the tracks displayed on the track selection screen image 210 is tapped to select this track.

In this instance, the CPU 110 acquires sound of the track from a music file corresponding to the tapped title of the track and then successively outputs the sound from the headphone terminal not shown.

As described above, in the tune reproduction application, a stretchable cursor Cs directed vertically is displayed on the track selection screen image 210 in response to dragging in a vertical direction. Then, in the tune reproduction application, if the end point of the stretchable cursor Cs displayed is positioned in the central region 210B, then the scroll direction and the value of the scroll speed of the track list are set in response to the direction, that is, the upward or downward direction, and the length of the stretchable cursor Cs.

Further, in the present tune reproduction application, if the end point of the stretchable cursor Cs goes out of the central region 210B into the upper end region 210A or the lower end region 210C in response to the dragging, then the display substance is transited from the track list to an album list which is information of a higher hierarchy.

At this time, in the present tune reproduction application, the scroll direction and the value of the scroll speed of the album list are set in response to the direction and the length of the stretchable cursor Cs.

If the length of the stretchable cursor Cs thereafter becomes smaller than the predetermined threshold value, then in the present tune reproduction application, the display substance is transited from the album list back into the track list which is information of a lower hierarchy.

In this instance, in the tune reproduction application, it is possible to carry out changeover between a track list and an album list or scroll a track list or an album list at a desired scroll speed only in response to an operation input through the stretchable cursor Cs.

Thus, the user can carry out searching from a search of an album to a search of a track readily.

Now, an operation input through the stretchable cursor Cs in the application for reproducing a still image, which is hereinafter referred to sometimes as still image reproduction application, is described in detail.

If, in a state in which an icon corresponding to startup of the still image reproduction application is displayed on the touch screen 102, the icon is tapped, then the CPU 110 accepts the touch operation as an operation input for starting up the still image reproduction application.

Then, the CPU 110 reads out and executes a program of the still image reproduction application from the nonvolatile memory 111 to start up the still image reproduction application.

After the still image reproduction application is started up, the CPU 110 causes thumbnail images of still images stored as still image files in the nonvolatile memory 111 to be displayed in a table on the touch screen 102.

Further, if one of the thumbnail images displayed in this manner is tapped, then the CPU 110 accepts the touch operation as an operation input for reproducing a still image.

Then, the CPU 110 acquires still images from a still image file corresponding to the tapped thumbnail image.

Figure 17:
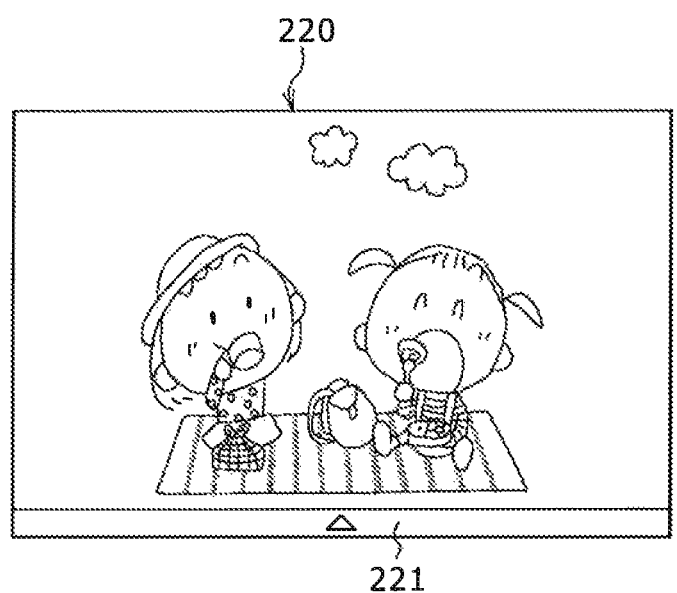
FIG. 17 is a schematic view showing a configuration of a still image reproduction screen image.

Further, at this time, the CPU 110 causes a still image reproduction screen image 220 shown in FIG. 17 to be displayed on the touch screen 102. It is to be noted that this still image reproduction screen image 220 is a horizontally elongated screen image and is displayed over an overall area of the horizontally elongated touch screen 102 assuming use thereof in a horizontally elongated state.

On the still image reproduction screen image 220, a still image is displayed over a substantially overall area. Further, an upper end point of a pallet 221 is displayed at a lower end of the still image reproduction screen image 220 such that, if the upper end point is touched and dragging in an upward direction of the screen is carried out, then the pallet 221 can be pulled out to and displayed on the still image reproduction screen image 220. This pallet 221 is a pallet for adjusting the luminance and the saturation, which are parameters of a still image. The pallet is hereinafter referred to also as luminance saturation pallet and hereinafter described.

On the still image reproduction screen image 220, the adjustment speed, that is, the adjustment direction and the value of the adjustment speed, of the zoom ratio, that is, the magnification/reduction ratio, which is a parameter of a still image, can be controlled by dragging in a vertical direction with respect to the displayed still image.

It is assumed that an arbitrary place of the still picture actually remains touched for a predetermined period of time as seen in FIG. 18A. Incidentally, such touching for a period of time equal to or longer than a predetermined period of time is referred to as long press, and touching for a period of time shorter than the predetermined period of time is referred to also as short press.

Consequently, the CPU 110 causes the circular stretchable cursor Cs centered at the long pressed position of the still image to be displayed at the position and sets the position to the center of zooming. Further, this position becomes also a start point of the stretchable cursor Cs.

It is to be noted that the magnitude of the stretchable cursor Cs displayed at this time is set, for example, to such a size that it protrudes a little from the touching finger.

Further, it is assumed that dragging in the vertical direction of the screen is carried out as shown in FIG. 18C while the long pressing finger is not spaced away.

Consequently, the CPU 110 stretches the stretchable cursor Cs in the vertical direction from the start point, that is, from the position of the first long press, to the end point of the dragging in response to the dragging.

Here, if the CPU 110 recognizes that the direction of the stretchable cursor Cs is the vertical direction, then the CPU 110 controls the adjustment speed of the zoom ratio, that is, the "magnification/reduction ratio" of the still image to adjust the zoom ratio in response to the direction and the length of the stretchable cursor Cs at this time with the start point of the stretchable cursor Cs set as the center of zooming.

In particular, if the stretchable cursor Cs displayed is directed upwardly, then the CPU 110 sets the adjustment direction of the zoom ratio to a zooming in or magnifying direction, that is, in a direction in which the zoom ratio increases from 100%. On the other hand, if the stretchable cursor Cs displayed is directed downwardly, then the CPU 110 sets the adjustment direction of the zoom ratio to a zooming out or reducing direction, that is, in a direction in which the zoom ratio decreases from 100%. Further, the adjustment speed of the zoom ratio, that is, the magnification/reduction ratio, of the still image is set to a higher value as the length of the stretchable cursor Cs at this time becomes greater.

As a result, for example, if the stretchable cursor Cs is stretched long upwardly by dragging in an upward direction of the screen, then the zoom ratio of the still image increases at once. Consequently, the still image displayed on the still image reproduction screen image 220 is expanded at once around the center which is the start point of the stretchable cursor Cs.

On the other hand, for example, if the stretchable cursor Cs is stretched short downwardly by dragging in a downward direction of the screen, then the zoom ratio of the still image decreases slowly. Consequently, the still image displayed on the still image reproduction screen image 220 is reduced slowly around the center which is the start point of the stretchable cursor Cs.

Further, if the finger is not spaced away from nor moved on the touch screen 102 after such dragging in the vertical direction of the screen, then the stretchable cursor Cs continues to be displayed without changing the direction and the length thereof and the adjustment speed, that is, the adjustment direction and the value of the adjustment speed, at this time is maintained.

In this manner, on the still image reproduction screen image 220, while a start point-end point direction and a start point-end point distance of dragging are indicated to the user by the stretchable cursor Cs, the zoom ratio of a still image can be adjusted at a desired adjustment speed in response to an operation input through the stretchable cursor Cs.

Further, on the still image reproduction screen image 220, a series of operations from setting of the center of zooming to adjustment of the zoom ratio can be carried out seamlessly only by dragging after long press.

Thus, the user can watch an overall still image or set a desired portion to a desired size and watch the desired portion readily and rapidly through the still image reproduction screen image 220.

Thereafter, when the dragging comes to an end, the CPU 110 moves the end point side of the stretchable cursor Cs toward the start point side of the stretchable cursor Cs to contract the stretchable cursor Cs stretched in the vertical direction until it comes to have a circuit shape and then erases the stretchable cursor Cs from the screen, thereby ending the adjustment of the zoom ratio. At this time, also the center of the zooming is reset. Thereafter, the zoom ratio at the time immediately before the dragging comes to an end is maintained.

Further, on the still image reproduction screen image 220, the still image displayed can be scrolled by carrying out dragging or flicking in an arbitrary direction after short press without carrying out long press.

It is assumed that dragging or flicking in an arbitrary direction after short press is carried out. In this instance, the CPU 110 controls scrolling of the still image in response to the direction and the length of the dragging or to the direction and the speed of flicking to scroll the still image.

In particular, the CPU 110 causes the still image to scroll by an amount corresponding to the length of the dragging or corresponding to the speed of the flicking in the direction same as or opposite to the direction of the dragging or the flicking.

In this manner, on the still image reproduction screen image 220, an operation input by dragging can be changed over to adjustment of the zoom ratio or scrolling by long press.

Further, on the still image reproduction screen image 220, if an arbitrary place of the still image is long pressed, then the stretchable cursor Cs of such a size that the stretchable cursor Cs protrudes from the long press finger is displayed at the position. Consequently, it is possible to allow the user to readily recognize that the long pressed place is set to the center of zooming and an operation input by dragging is changed over to adjustment of the zoom ratio.

On the other hand, it is assumed that an upper end point of the luminance and saturation pallet 221 displayed at the lower end of the still image reproduction screen image 220 is touched, and flicking or dragging in the upwardly direction of the screen is carried out.

Figure 19A:
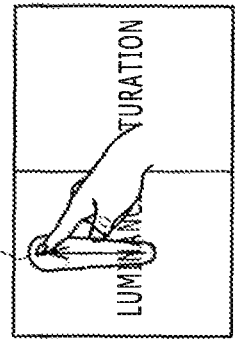
FIGS. 19A to 19E are schematic views illustrating another example of an operation input through the stretchable cursor in the still image reproduction application.

In this instance, the CPU 110 pulls out the luminance and saturation pallet 221 in the upward direction from the lower end of the still image reproduction screen image 220 in response to the flicking as seen in FIG. 19A.

This luminance and saturation pallet 221 has a horizontal width equal to the horizontal width of the still image reproduction screen image 220 and is pulled out in such a manner as to cover, for example, the still image reproduction screen image 220 from a lower end to an upper end, that is, over the overall screen.

Further, the luminance and saturation pallet 221 is divided into two regions including a region 221L on the left side which is used for adjustment of the luminance and a region 221R on the right side which is used for adjustment of the saturation. It is to be noted that the region 221L on the left side is hereinafter referred to also as luminance setting region and the region 221R is hereinafter referred to as saturation setting region.

Each of the luminance setting region 221L and the saturation setting region 221R is transparent at a portion other than an outer framework thereof such that a still picture displayed on the still image reproduction screen image 220 can be watched therethrough.

Characters "Luminance" are displayed in the luminance setting region 221L, and characters "Saturation" are displayed in the saturation setting region 221R.

On the luminance and saturation pallet 221, the luminance of a still image can be adjusted by dragging in a vertical direction from a start point in the luminance setting region 221L, and the saturation of the still image can be adjusted by dragging in a vertical direction from a start point in the saturation setting region 221R.

Figure 19B:
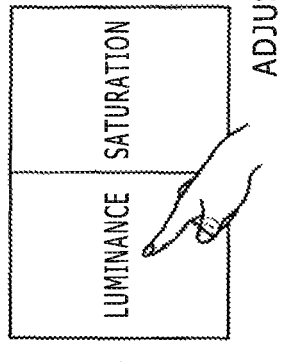
Figure 19C:
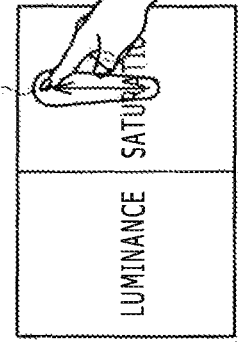

It is assumed that the inside of the luminance setting region 221L is touched actually and dragging in a vertical direction of the screen is carried out as seen in FIGS. 19B and 19C. In this instance, the CPU 110 causes the stretchable cursor Cs, which stretches in the vertical direction from a start point to an end point of the dragging, to be displayed on the screen in response to the dragging.

If the CPU 110 recognizes that the stretchable cursor Cs displayed is directed vertically, then the CPU 110 controls the adjustment speed of the luminance of the still image displayed, that is, the adjustment direction and the value of the adjustment speed, in response to the direction and the length of the stretchable cursor Cs at this time.

In particular, if the stretchable cursor Cs displayed is directed upwardly, then the CPU 110 sets the adjustment direction of the luminance to a direction in which the luminance is increased. On the other hand, if the stretchable cursor Cs displayed is directed downwardly, then the CPU 110 sets the adjustment direction of the luminance to a direction in which the luminance is decreased. Further, the adjustment speed of the luminance is set to a higher value as the length of the stretchable cursor Cs at this time becomes greater.

As a result, for example, if the stretchable cursor Cs is stretched long upwardly by dragging in the upward direction of the screen, then the luminance of the still image displayed increases at once.

On the other hand, if the stretchable cursor Cs is stretched short downwardly by the dragging in the downward direction of the screen, then the luminance of the still image displayed drops slowly.

Further, if the finger is not spaced away from nor moved on the touch screen 102 after such dragging in the vertical direction of the screen, then the stretchable cursor Cs continues to be displayed without changing the direction and the length thereof and the adjustment speed, that is, the adjustment direction and the value of the adjustment, at this time is maintained.

Figure 19D:
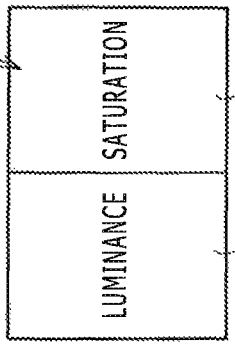
Figure 19E:
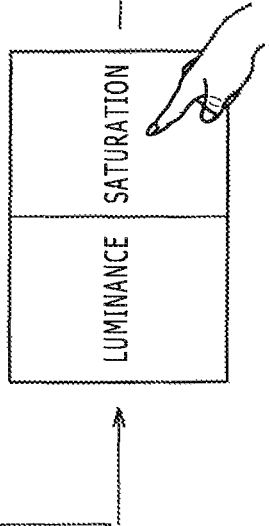

On the other hand, it is assumed that the inside of the saturation setting region 221R is touched and dragging in a vertical direction of the screen is carried out as seen in FIGS. 19D and 19E. In this instance, the CPU 110 causes the stretchable cursor Cs, which is stretched in the vertical direction from a start point to an end point of the dragging, to be displayed on the screen.

If the CPU 110 recognizes that the stretchable cursor Cs displayed is directed vertically, then the CPU 110 controls the adjustment speed of the saturation of the still image displayed in response to the direction and the length of the stretchable cursor Cs.

In particular, the CPU 110 sets the adjustment direction of the saturation to a direction in which the saturation is increased if the stretchable cursor Cs displayed is directed upwardly. On the other hand, if the stretchable cursor Cs displayed is directed downwardly, then the CPU 110 sets the adjustment direction of the saturation to a direction in which the saturation is lowered. Further, the adjustment speed of the saturation is set to a higher value as the length of the stretchable cursor Cs at this time becomes greater.

As a result, for example, if the stretchable cursor Cs is stretched long upwardly by dragging in the upward direction of the screen, then the saturation of the still picture displayed increases at once.

On the other hand, if the stretchable cursor Cs is stretched short downwardly by the dragging in the downward direction of the screen, then the saturation of the still image displayed decreases slowly.

Further, if the finger is not spaced away from nor moved on the touch screen 102 after such dragging in the vertical direction of the screen, then the stretchable cursor Cs continues to be displayed without changing the direction and the length thereof and the adjustment speed at this time is maintained.

In this manner, while the luminance and saturation pallet 221 indicates a start point-end point direction and a start point-end point distance of the dragging to the user by the stretchable cursor Cs, the luminance or the saturation can be adjusted at a desired adjustment speed in response to an operation input through the stretchable cursor Cs.

Further, since the luminance and saturation pallet 221 is transparent at any other portion than the framework thereof, the user can adjust the luminance or the saturation while visually observing a still image displayed below the luminance and saturation pallet 221.

Thereafter, when the dragging comes to an end, the CPU 110 moves the end point side toward the start point side of the stretchable cursor Cs to contract the stretchable cursor Cs stretched in the vertical direction until it comes to have a circular shape and then erases the stretchable cursor Cs from the screen. The adjustment of the luminance and the saturation is completed therewith. Thereafter, the luminance or the saturation at the time immediately prior to the end of the dragging is maintained.

As described above, in the still image reproduction application, if an arbitrary place of the still image displayed on the still image reproduction screen image 220 is long pressed, then the stretchable cursor Cs of a circular shape is displayed at the long pressed position. Further, in the still image reproduction application at this time, the long pressed position is set to the center of zooming, and the operation input by dragging is changed over to adjustment of the zoom ratio from scrolling of a still picture.

Then, in the present still image reproduction application, the stretchable cursor Cs is stretched in a vertical direction in response to the dragging in the vertical direction, and the adjustment direction and the value of the adjustment speed of the zoom ratio of a still image are set in response to the direction, that is, the upward or downward direction, and the length of the stretchable cursor Cs.

Further, in the present still image reproduction application, if dragging or flicking is carried out without long press, then the still image displayed on the still image reproduction screen image 220 is scrolled in response to the dragging or the flicking.

In this manner, in the still image reproduction application, the operation input by dragging can be changed over between adjustment of the zoom ratio and scrolling by long press, and adjustment of the zoom ratio and scrolling of a still image can be carried out only by the dragging.

Further, in the still image reproduction application, if dragging in a vertical direction is carried out from a start point in the luminance and saturation pallet 221, then the vertically elongated stretchable cursor Cs is displayed in response to the dragging.

Here, in the still image reproduction application, if the start point of dragging is within the luminance setting region 221L of the luminance and saturation pallet 221, then the adjustment direction of the luminance of the still image and the value of the adjustment speed are set in response to the direction and the length of the stretchable cursor Cs.

On the other hand, in the still image reproduction application, if the start point of dragging is within the saturation setting region 221R, then the adjustment direction and the value of the adjustment speed of the saturation of the still picture are set in response to the direction and the length of the stretchable cursor Cs.

In the still image reproduction application, depending upon the position of the start point of dragging in the luminance and saturation pallet 221, the operation input by the dragging can be changed over to adjustment of the luminance or adjustment of the saturation of the still image.

Further, in the present still image reproduction application, only by an operation input through the stretchable cursor Cs by dragging in a vertical direction, the luminance or the saturation of the still image can be adjusted while freely changing the adjustment direction and the value of the adjustment speed.

As described above, the portable terminal 100 can readily carry out reproduction of a dynamic image, changeover of the display substance, scrolling of various lists and adjustment of various parameters only by an operation input through the stretchable cursor Cs by dragging.

2-4. Operation Input Processing Procedure

Now, a procedure of a particular process executed by the portable terminal 100 in response to an operation input through the stretchable cursor Cs, that is, an operation input processing procedure, is described.

2-4-1. Operation Input Processing Procedure in the Dynamic Picture Image Reproduction Application First, the operation input processing procedure when reproduction of a chapter, changeover of a chapter and a chapter list and scrolling of a chapter list are carried out in the dynamic image reproduction application is described with reference to FIG. 20.

It is to be noted that the operation input processing procedure RT1 illustrated in FIG. 20 is executed by the CPU 110 of the portable terminal 100 in accordance with a program of the dynamic image reproduction application stored in the nonvolatile memory 111.

If the dynamic image reproduction application is started up and one of thumbnail images of dynamic images displayed in a table is tapped, then the CPU 110 starts the operation input processing procedure RT1 and advances its processing to step SP1. At step SP1, the CPU 110 decides based on an input signal from the touch panel 102B whether or a touch operation for the touch panel 102B is carried out.

If a negative result is obtained at step SP1, then the CPU 110 advances the processing to step SP2, at which it reproduces a dynamic image corresponding to the tapped thumbnail image at the standard speed in the forward direction, that is, carries out normal reproduction. Thereafter, the processing returns to step SP1.

On the other hand, if an affirmative result is obtained at step SP1, then the CPU 110 advances the processing to step SP3. At step SP3, the CPU 110 causes a stretchable cursor Cs to be displayed suitably in response to the touch operation then and decides whether or not the touch operation then is dragging in a horizontal direction of the screen.

If a negative result is obtained, then the CPU 110 returns the processing to step SP1. On the other hand, if an affirmative result is obtained at step SP3, then the CPU 110 advances the processing to step SP4.

At step SP4, the CPU 110 decides whether or not the display substance at present is a chapter. If an affirmative result is obtained at step SP4, then the CPU 110 advances the processing to step SP5.

At step SP5, the CPU 110 decides whether or not an end point of the stretchable cursor Cs displayed, that is, an end point of the dragging, is within the left end region 200A or the right end region 200C.

If a negative result is obtained, then this signifies that the display substance at present is a chapter and the end point of the stretchable cursor Cs is outside the left end region 200A or the outside the dynamic image reproduction screen image 200, or in other words, within the central region 200B.

At this time, the CPU 110 advances the processing to step SP6, at which it controls the reproduction speed of the chapter in response to the direction and the length of the stretchable cursor Cs displayed. Thereafter, the CPU 110 returns the processing to step SP1.

On the other hand, if an affirmative result is obtained at step SP5, then this signifies that the display substance at present is a chapter and the end point of the stretchable cursor Cs is within the left end region 200A or the right end region 200C, that is, outside the central region 200B.

At this time, the CPU 110 advances the processing to step SP7, at which it transits the display substance from the chapter to a chapter list which is information of a higher hierarchy. Thereafter, the CPU 110 returns the processing step SP1.

On the other hand, if a negative result is obtained at step SP4 described hereinabove, then this signifies that the display substance at present is a chapter list.

At this time, the CPU 110 advances the processing to step SP8, at which it controls the scroll speed of the chapter list in response to the direction and the length of the stretchable cursor Cs displayed. Thereafter, the CPU 110 returns the processing step SP1.

In accordance with such an operation input processing procedure RT1 as described above, the CPU 110 carries out reproduction of a chapter, changeover between a chapter and a chapter list and scrolling of a chapter list in response to an operation input through the stretchable cursor Cs by dragging.

Now, the operation input processing procedure when adjustment of the sound volume is carried out in the dynamic image reproduction application is described with reference to FIG. 21.

Figure 21:
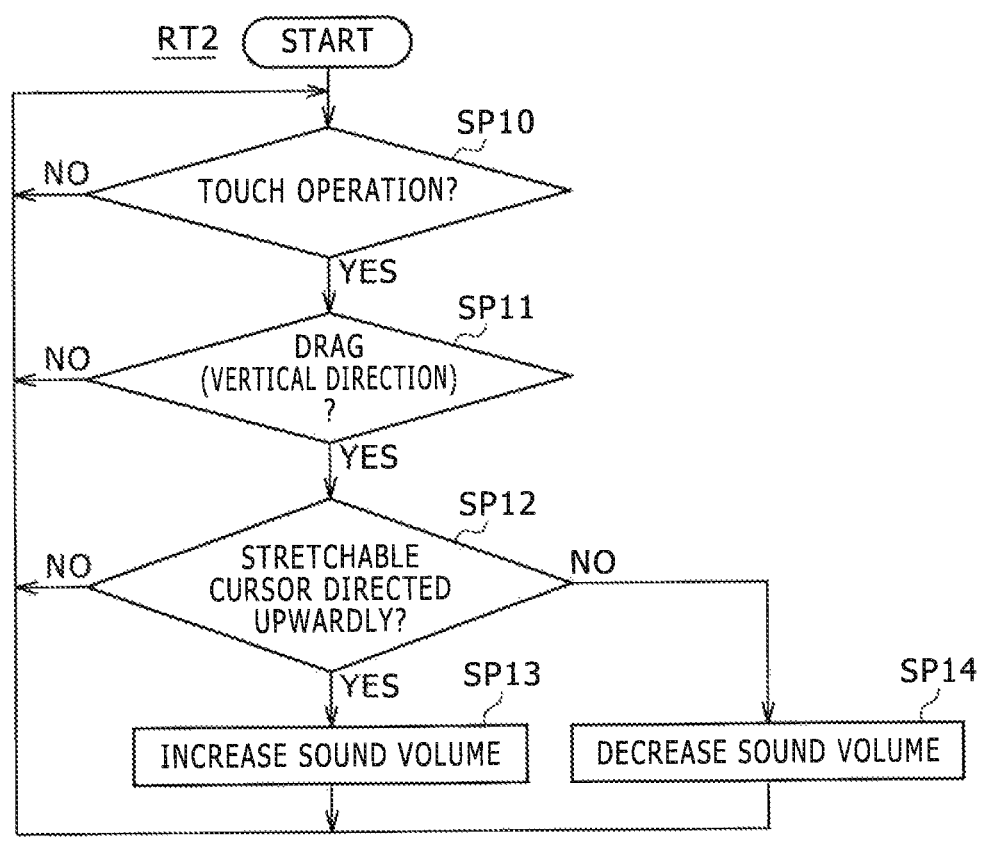

It is to be noted that also the operation input processing procedure RT2 illustrated in FIG. 21 is executed by the CPU 110 of the portable terminal 100 in accordance with the program of the dynamic image reproduction application stored in the nonvolatile memory 111.

If the dynamic image reproduction application is started up and one of thumbnail images of dynamic images displayed in a table is tapped, then the CPU 110 starts the operation input processing procedure RT2 and advances its processing to step SP10. At step SP10, the CPU 110 decides based on an input signal from the touch panel 102B whether or not a touch operation for the touch panel 102B is found.

The CPU 110 waits until an affirmative result is obtained at step SP10, and when an affirmative result is obtained, the CPU 110 advances the processing to step SP11.

At step SP11, the CPU 110 causes a stretchable cursor Cs to be displayed suitably in response to the touch operation then and decides whether or not the touch operation is dragging in a vertical direction of the screen.

If a negative result is obtained at step SP11, then the CPU 110 returns the processing to step SP10. On the other hand, if an affirmative result is obtained at step SP11, then the CPU 110 advances the processing to step SP12.

At step SP12, the CPU 110 decides whether or not the stretchable cursor Cs displayed then is directed upwardly, or in other words, whether or not the end point of the dragging is positioned higher than the start point.

If an affirmative result is obtained at step SP12, then this signifies that the stretchable cursor Cs is directed upwardly, that is, the end point of the dragging is positioned higher than the start point of the dragging.

At this time, the CPU 110 advances the step SP13, at which the CPU 110 increases the sound volume at an adjustment speed in accordance with the direction, which in this instance is the upward direction, and the length of the stretchable cursor Cs displayed then. Thereafter, the CPU 110 returns the processing to step SP10.

On the other hand, if a negative result is obtained at step SP12, then this signifies that the stretchable cursor Cs is directed downwardly, that is, the end point of the dragging is positioned lower than the start point.

At this time, the CPU 110 advances the processing to step SP14, at which it decreases the sound volume at an adjustment speed in accordance with the direction, which in this instance is the downward direction, and the length of the stretchable cursor Cs displayed then. Thereafter, the CPU 110 returns the processing to step SP10.

The CPU 110 carries out adjustment of the sound volume in response to an operation input through the stretchable cursor Cs by the dragging in accordance with such an operation input processing procedure RT2 as described above.

2-4-2. Operation Input Processing Procedure in the Tune Reproduction Application Now, an operation input processing procedure when changeover between a track list and an album list and scrolling of a track list and an album list are carried out in the tune reproduction application is described with reference to FIG. 22.

Figure 22:
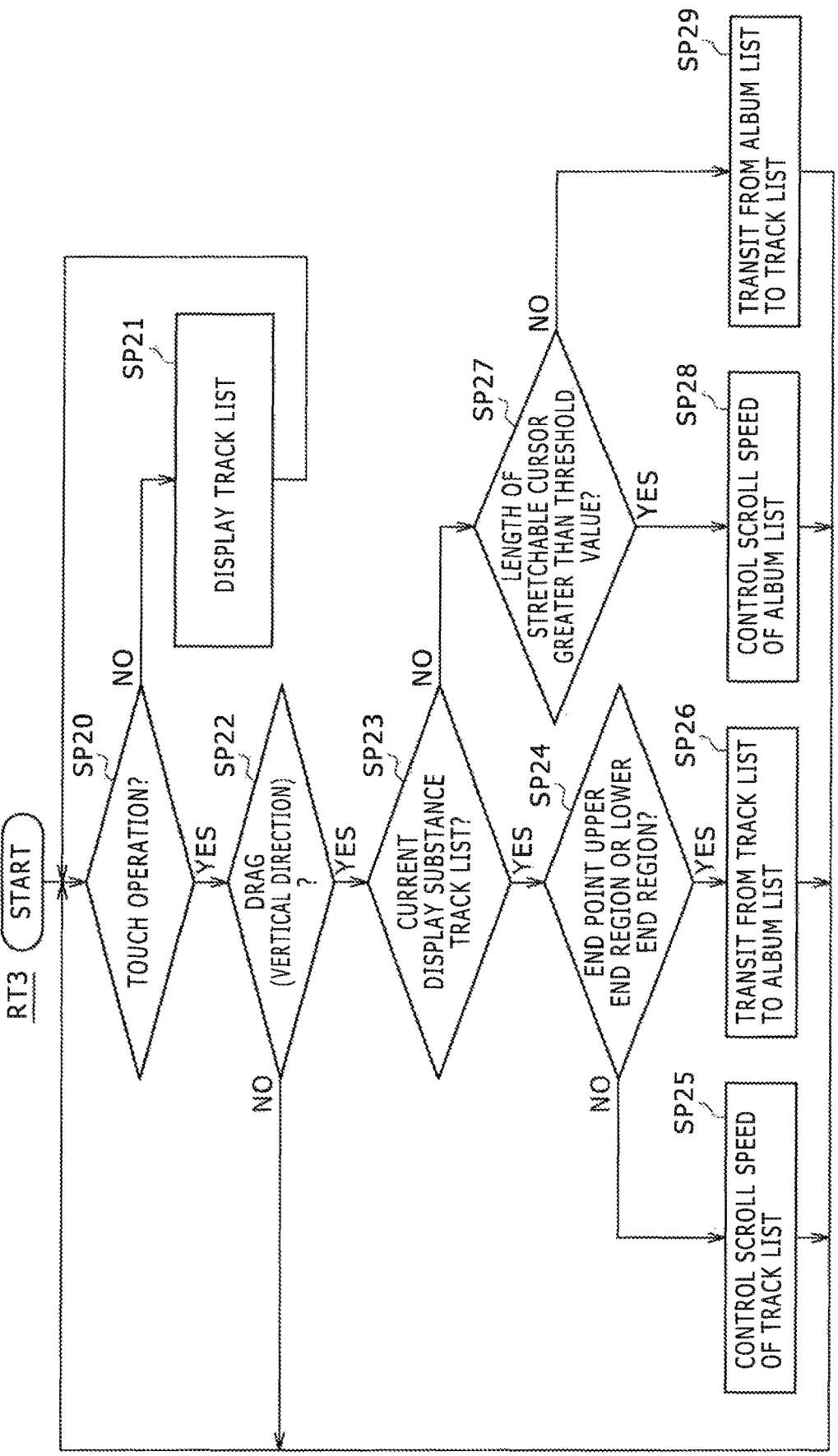

It is to be noted that the operation input processing procedure RT3 illustrated in FIG. 22 is executed by the CPU 110 of the portable terminal 100 in accordance with the program of the tune reproduction application stored in the nonvolatile memory 111.

After the tune reproduction application is started up, the CPU 110 starts the operation input processing procedure RT3 and advances its processing to step SP20. At step SP20, the CPU 110 decides based on an input signal from the touch panel 102B whether or not a touch operation for the touch panel 102B is detected.

If a negative result is obtained at step SP20, then the CPU 110 advances the processing to step SP21, at which it causes a track list to be displayed on the track selection screen image 210, whereafter the CPU 110 returns the processing to step SP20.

On the other hand, if an affirmative result is obtained at step SP20, then the CPU 110 advances the processing to step SP22. At step SP22, the CPU 110 causes a stretchable cursor Cs to be displayed suitably in response to the touch operation then and decides whether or not the touch operation then is dragging in a vertical direction of the screen.

If a negative result is obtained at step SP22, then the CPU 110 returns the processing to step SP20. On the other hand, if an affirmative result is obtained, then the CPU 110 advances the processing to step SP23.

At step SP23, the CPU 110 decides whether or not the display substance at present is a track list. If an affirmative result is obtained at step SP23, then the CPU 110 advances the processing to step SP24.

At step SP24, the CPU 110 decides whether or not an end point of the stretchable cursor Cs displayed, that is, an end point of the dragging, is within the upper end region 210A or the lower end region 210C.

If a negative result is obtained at step SP24, then this signifies that the display substance at present is a track list and the end point of the stretchable cursor Cs is not within the upper end region 210A nor within the lower end region 210C but within the central region 210B.

At this time, the CPU 110 advances the processing to step SP25, at which it controls the scroll speed of the track list in response to the direction and the length of the stretchable cursor Cs displayed. Thereafter, the CPU 110 returns the processing to step SP20.

On the other hand, if an affirmative result is obtained at step SP24, then this signifies that the display substance at present is a check list and the end point of the stretchable cursor Cs is within the upper end region 210A or the lower end region 210C and hence outside the central region 210B.

At this time, the CPU 11.0 advances the processing to step SP26, at which it transits the display substance from the track list to an album list which is information of a higher hierarchy. Thereafter, the CPU 110 returns the processing to step SP20.

On the other hand, if a negative result is obtained at step SP23, then this signifies that the display substance at present is an album list.

At this time, the CPU 110 advances the processing to step SP27, at which it decides whether or not the length of the stretchable cursor Cs displayed exceeds a predetermined threshold value.

If an affirmative result is obtained at step 27, then this signifies that the display substance at present is an album list and the length of the stretchable cursor Cs exceeds the predetermined threshold value.

At this time, the CPU 110 advances the processing to step SP28, at which it controls the scroll speed of the album list in response to the direction and the length of the stretchable cursor Cs. Thereafter, the CPU 110 returns the processing to step SP20.

On the other hand, if a negative result is obtained at step SP27, then this signifies that the display substance at present is an album list and the length of the stretchable cursor Cs is equal to or smaller than the predetermined threshold value.

At this time, the CPU 110 advances the processing to step SP29, at which it transits the display substance from the album list to a track list which is information of a lower hierarchy. Thereafter, the CPU 110 returns the processing to step SP20.

In accordance with such an operation input processing procedure RT3 as described above, the CPU 110 carries out changeover of the display substance and scrolling of a track list and an album list in response to an operation input through the stretchable cursor Cs by dragging.

2-4-3. Operation Input Processing Procedure in the Still Image Reproduction Application Now, the operation input processing procedure when adjustment of the zoom ratio which is a parameter of a still image is carried out in the still image reproduction application is described with reference to FIG. 23.

Figure 23:
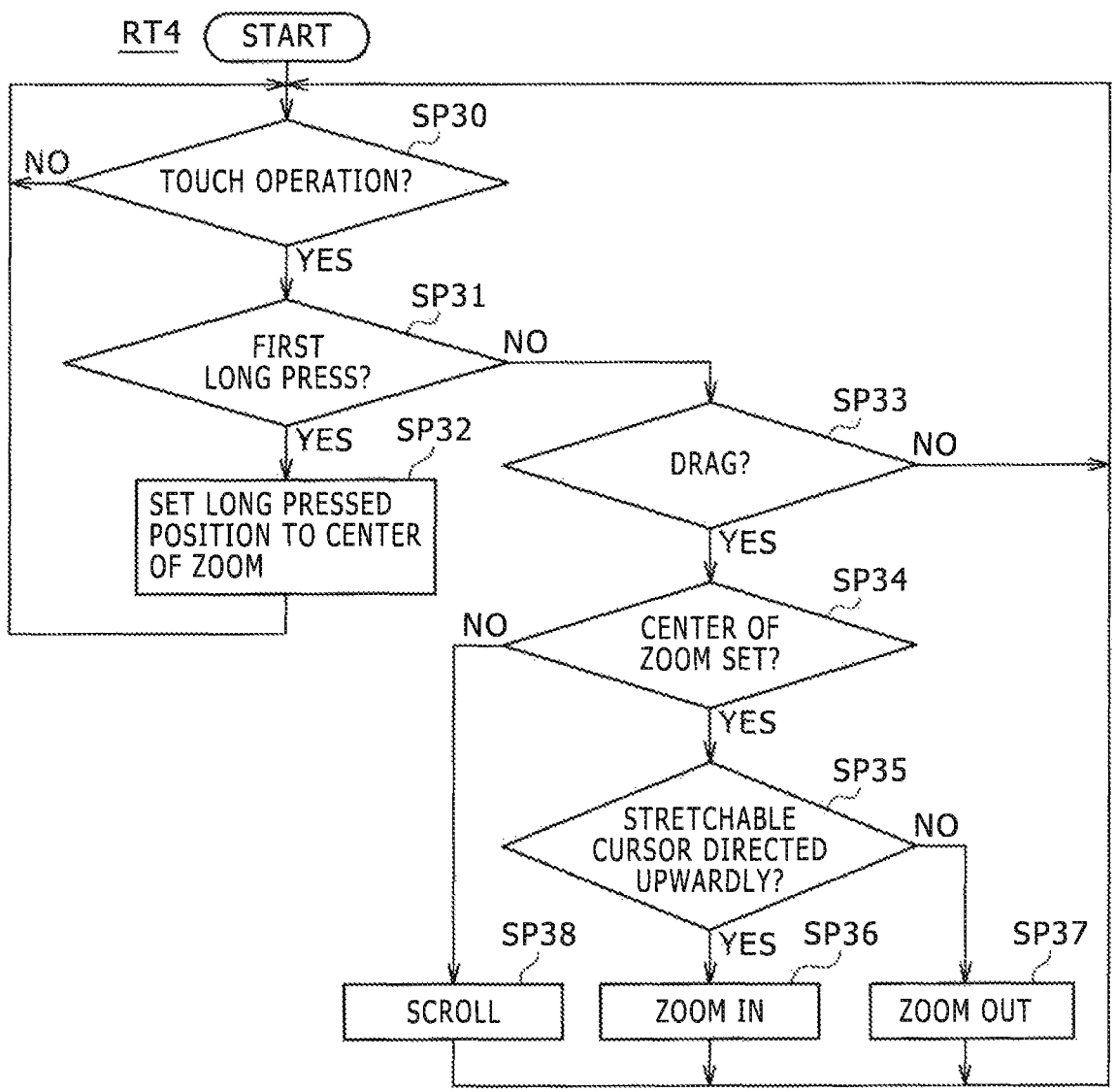

It is to be noted that the operation input processing procedure RT4 illustrated in FIG. 23 is executed by the CPU 110 of the portable terminal 100 in accordance with the program of the still image reproduction application stored in the nonvolatile memory 111.

If the still image reproduction application is started and one of thumbnail images of the still images displayed in a table is tapped, then the CPU 110 starts the operation input processing procedure RT4 and advances its processing to step SP30. At step SP30, the CPU 110 decides based on an input signal from the touch panel 102B whether or not a touch operation for the touch panel 102B is detected.

The CPU 110 waits until an affirmative result is obtained at step SP30, and if an affirmative result is obtained, then the CPU 110 advances the processing to step SP31.

At step SP31, the CPU 110 decides based on the input signal from the touch panel 102B whether or not the touch operation then is first long press for the sill image displayed. It is to be noted that the first long press is long press at a position at which the finger touches first during a series of touch operations after the finger touches with the touch screen 102 until it is spaced away from the touch screen 102.

If an affirmative result is obtained at step SP31, then the CPU 110 advances the processing to step SP32. At step SP32, the CPU 110 causes a stretchable cursor Cs to be displayed at the long pressed position and sets the long pressed position as the center of zooming. Thereafter, the CPU 110 returns the processing to step SP30.

On the other hand, if an affirmative result is obtained at step SP31, then the CPU 110 advances the processing to step SP33. At step SP33, the CPU 110 decides based on the input signal from the touch panel 102B whether or not the touch operation then is dragging.

If a negative result is obtained at step SP33, then the CPU 1.10 returns the processing to step SP30. In contrast, if an affirmative result is obtained at step SP33, then the CPU 110 advances the processing to step SP34.

At step SP34, the CPU 110 decides whether or not the center of zooming is set already.

If an affirmative result is obtained at step SP34, then this signifies that the center of zooming is set already, that is, the dragging carried out at present is dragging after long press.

At this time, the CPU 110 advances the processing to step SP35, at which it decides whether or not the stretchable cursor Cs displayed is directed upwardly, that is, whether or not the end point of the dragging is positioned higher than the start point of the dragging.

If a negative result is obtained at step SP35, then this signifies that the stretchable cursor Cs is directed upwardly, that is, the end point of the dragging is positioned higher than the start point of the dragging.

At this time, the CPU 110 advances the processing to step SP36. At step SP36, the CPU 110 increases the magnification of a still image, that is, zooms in, around the center provided by the position which is set as the center of zooming at an adjustment speed in accordance with the direction, which at present is the upward direction, and the length of the stretchable cursor Cs displayed. Thereafter, the CPU 110 returns the processing to step SP30.

In contrast, if a negative result is obtained at step SP35, then this signifies that the stretchable cursor Cs is directed downwardly, that is, the end point of the dragging is positioned lower than the start point of the dragging.

At this time, the CPU 110 advances the processing to step SP37. At step SP37, the CPU 110 decreases the reduction ratio of the still image, that is, zooms out, around the center provided by the position set as the center of zooming at an adjustment speed in accordance with the direction, which at present is the downward direction, and the length of the stretchable cursor Cs displayed. Thereafter, the CPU 110 returns the processing to step SP30.

On the other hand, if a negative result is obtained at step SP34, then this signifies that the center of zooming is not set as yet, that is, the dragging carried out at present is dragging or flicking after short press.

At this time, the CPU 110 advances the processing to step SP38, at which it scrolls the still image in response to the direction and the length of the dragging or flicking. Thereafter, the CPU 110 returns the processing to step SP30.

In accordance with such an operation input processing procedure RT4 as described above, the CPU 110 carries out adjustment of the zoom ratio which is a parameter of a still image in response to an operation input through the stretchable cursor Cs by dragging.

Now, the operation input processing procedure when adjustment of the luminance and the saturation is carried out in the still image reproduction application is described with reference to FIG. 24.

Figure 24:
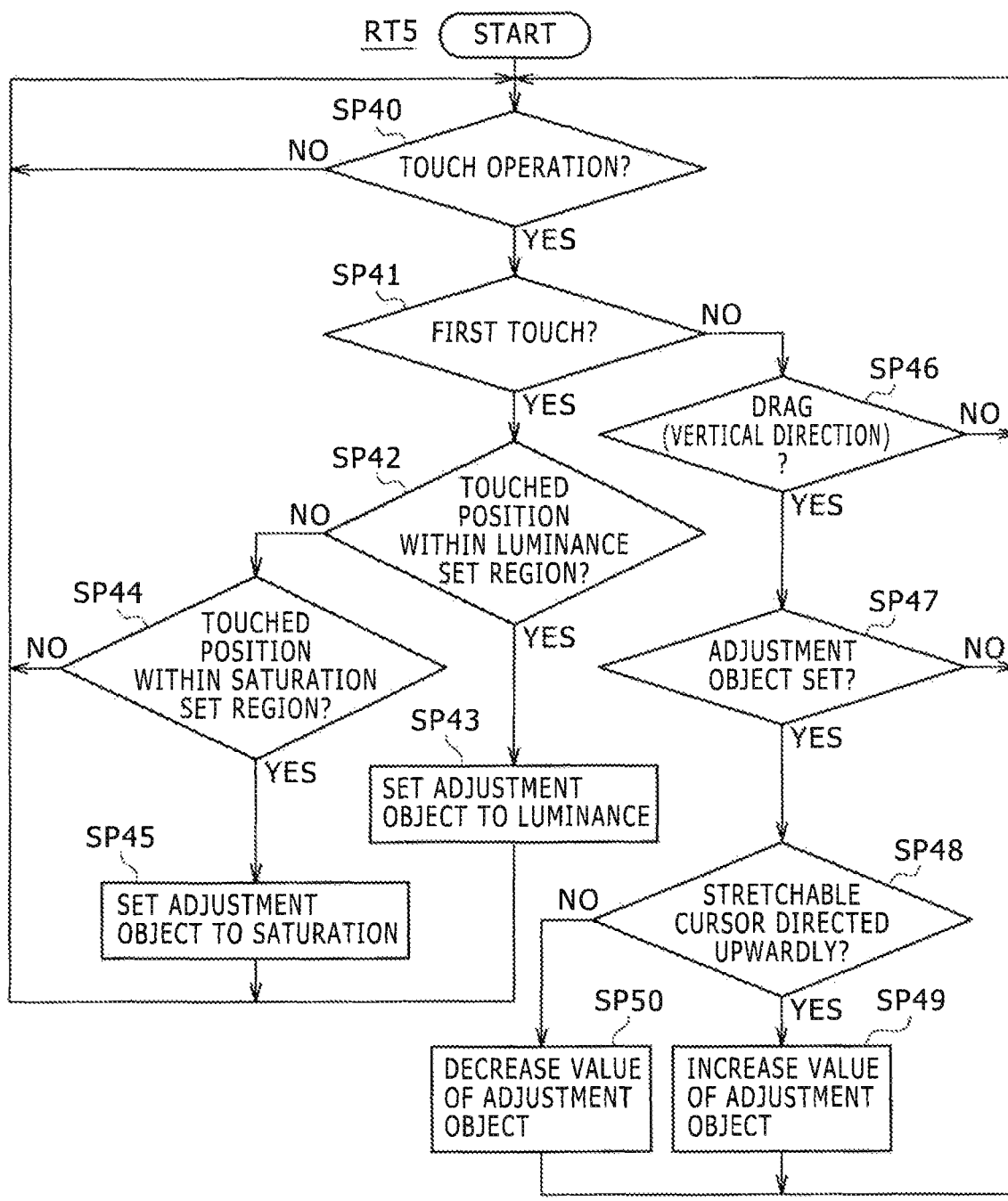

It is to be noted that also the operation input processing procedure RT5 illustrated in FIG. 24 is executed by the CPU 110 of the portable terminal 100 in accordance with the program of the still image reproduction application stored in the nonvolatile memory 111.

If the luminance and saturation pallet 221 is pulled out and displayed on the still image processing screen image 220, then the CPU 110 starts the operation input processing procedure RT5 and advances its processing to step SP40. At step SP40, the CPU 110 decides based on an input signal from the touch panel 102B whether or not a touch operation for the touch panel 102B is detected.

The CPU 110 waits until an affirmative result is obtained at step SP40, and if an affirmative result is obtained, then the CPU 110 advances the processing to step SP41.

At step SP41, the CPU 110 decides whether or not the touch operation then is first touching. It is to be noted that the first touching signifies touching at a position which was touched first within a series of touch operations after the finger touches with the touch panel 102 until the finger is spaced away from the touch panel 102.

If a negative result is obtained at step SP41, then the CPU 110 returns the processing to step SP40. On the other hand, if an affirmative result is obtained at step SP41, then the CPU 110 advances the processing to step SP42.

At step SP42, the CPU 110 decides whether or not the first touched position is within the luminance setting region 221L.

If an affirmative result is obtained at step SP42, then this signifies that the first touched position is within the luminance setting region 221L. At this time, the CPU 110 advances the processing to step SP43.

At step SP43, the CPU 110 causes a stretchable cursor Cs to be displayed at the touched position and sets the adjustment object to the luminance, and then returns the processing to step SP40.

On the other hand, if an affirmative result is obtained at step SP42, then this signifies that the first touched position is not within the luminance setting region 221L.

At this time, the CPU 110 advances the processing to step SP44, at which it decides whether or not the first touched position is within the saturation setting region 221R.

If a negative result is obtained at step SP44, then this signifies that the first touched position is not within the luminance setting region 221L nor within the saturation setting region 221R. At this time, the CPU 110 returns the processing to step SP40.

On the other hand, if an affirmative result is obtained at step SP44, then this signifies that the first touched position is within the saturation setting region 221R. At this time, the CPU 110 advances the processing to step SP45.

At step SP45, the CPU 110 causes a stretchable cursor Cs to be displayed at the touched position and sets the adjustment object to the saturation, whereafter it returns the processing to step SP40.

On the other hand, if a negative result is obtained at step SP41, then this signifies that the touch operation then is not a first touch.

At this time, the CPU 110 advances the processing to step SP46, at which it decides whether or not the touch operation then is dragging in a vertical direction.

If a negative result is obtained, then this signifies that the touch operation than is not first touching nor dragging. At this time, the CPU 110 returns the processing to step SP40.

On the other hand, if an affirmative result is obtained at step SP46, then this signifies that the touch operation then is dragging in a vertical direction. At this time, the CPU 110 advances the processing to step SP47.

At step SP47, the CPU 110 decides whether or not an adjustment object is set already.

If a negative result is obtained at step SP47, then this signifies that an adjustment object is not set as yet, that is, the dragging carried out at present is dragging from the touching carried out on the outside of the luminance setting region 221L and the saturation setting region 221R. At this time, the CPU 110 returns the processing to step SP40.

On the other hand, if an affirmative result is obtained at step SP47, then this signifies that an adjustment object is set already, that is, the dragging carried out at present is dragging from the touching carried out within the luminance setting region 221L or the saturation setting region 221R.

At this time, the CPU 110 advances the processing to step SP48, at which it decides whether or not the stretchable cursor Cs displayed is directed upwardly, that is, whether or not the end point of the dragging is positioned higher than the start point of the dragging.

If a negative result is obtained at step SP48, then this signifies that the stretchable cursor Cs is directed upwardly, that is, the end point of the dragging is positioned higher than the start point of the dragging.

At this time, the CPU 110 advances the processing to step SP49 at which it increases the value of the adjustment object, that is, the luminance or the saturation, at an adjustment speed which depends upon the direction, which at present is the upward direction, and the length of the stretchable cursor Cs displayed. Thereafter, the CPU 110 returns the processing to step SP40.

On the other hand, if a negative result is obtained at step SP48, then this signifies that the stretchable cursor Cs is directed downwardly, that is, the end point of the dragging is positioned lower than the start point of the dragging.

At this time, the CPU 110 advances the processing to step SP50, at which the CPU 110 decreases the value of the adjustment object, that is, the luminance or the saturation, at an adjustment speed which depends upon the direction, which at present is the downward direction, and the length of the stretchable cursor Cs displayed. Thereafter, the CPU 110 returns the processing to step SP40.

In accordance with such an operation input processing procedure RT5 as described above, the CPU 110 carries out adjustment of the luminance and the saturation, which are parameters of a still image, in response to an operation input through the stretchable cursor Cs by dragging.

2-5. Operation and Effect of the First Embodiment

The CPU 110 of the portable terminal 100 having the configuration described above displays a horizontally directed stretchable cursor Cs in response to dragging in a horizontal direction on the dynamic image reproduction screen image 200 after the dynamic image reproduction application is started up.

Then, the CPU 110 reproduces a chapter while setting the reproduction direction and a value of the reproduction speed in response to the direction, which is the leftward or rightward direction, and the length of the stretchable cursor Cs displayed.

Consequently, in the portable terminal 100, the chapter can be reproduced by setting the reproduction, that is, the reproduction direction and the value of the reproduction speed, freely only by dragging in a horizontal direction.

If the dragging in the horizontal direction is further continued until the end point of the stretchable cursor Cs enters the left end region 200A or the right end region 200C, then the CPU 110 transits the display substance from a chapter to a chapter list which is information of a higher hierarchy.

In this manner, in the dynamic image reproduction application in the portable terminal 100, if only a series of dragging operations in a horizontal direction are carried out, then it is possible not only to freely set the reproduction speed to reproduce a chapter but also to change the display substance from a chapter to a chapter list.

Further, after the display substance is transited to a chapter list, the CPU 110 causes the chapter list to be scrolled while setting the scroll direction and the value of the scroll speed in response to the direction, which is the leftward or rightward direction, and the length of the displayed stretchable cursor Cs.

Consequently, in the portable terminal 100, it is possible to freely set the scroll speed, that is, the scroll direction and the value of the scroll speed, to scroll the chapter list only by dragging in a horizontal direction.

Further, after the tune reproduction application is started up, the CPU 110 of the portable terminal 100 causes a vertically directed stretchable cursor Cs to be displayed on the track selection screen 210 in response to dragging in a vertical direction.

Then, the CPU 110 sets the scroll direction and the value of the scroll speed of the track list in response to the direction, which is the upward or downward direction, and the length of the displayed stretchable cursor Cs.

Consequently, in the portable terminal 100, also it is possible to freely set the scroll speed, that is, the scroll direction and the value of the scroll speed, to scroll the chapter list only by dragging in a vertical direction.

Further, if the dragging in the vertical direction is continued until the end point of the stretchable cursor Cs enters the upper end region 210A or the lower end region 210C, then the CPU 110 transits the display substance from a track list to an album list which is information of a higher hierarchy.

In this manner, in the tune reproduction application in the portable terminal 100, if a series of dragging operations in a vertical direction are carried out, then it is possible not only to freely set the scroll speed to scroll a track list but also to change the display substance from a track list to an album list.

Furthermore, after the display substance is transited to an album list, the CPU 110 scrolls the album list while setting the scroll direction and the value of the scroll speed in response to the direction, which is the leftward or rightward direction, and the length of the displayed stretchable cursor Cs.

Consequently, also it is possible to freely set the scroll speed, that is, the scroll direction and the value of the scroll speed, to scroll the album list only by dragging in a horizontal direction.

The portable terminal 100 having the configuration described above not only can execute, only by a series of dragging operations, a reproduction process for a chapter being displayed but also can change the display substance from a chapter to a chapter list. Further, the portable terminal 100 not only can execute, only by a series of dragging operations, a scrolling process for a track list being displayed but also can change the display substance from a track list to an album list. Thus, when an operation input by dragging is carried out, the operability can be improved significantly in comparison with information processing apparatus in the past.

3. Second Embodiment

Now, a second embodiment is described. In the present second embodiment, an application for displaying a map, hereinafter referred to as map displaying application, is installed as an application ready for an operation input through a stretchable cursor Cs into a portable terminal.

It is to be noted that also the portable terminal is denoted by reference numeral 100 and is similar in hardware configuration and basic operation of an operation input through a stretchable cursor Cs to that of the first embodiment. Therefore, such hardware configuration and basic operation of the portable terminal 100 are omitted herein to avoid redundancy, but only an operation input through a stretchable cursor Cs in the map displaying application is described below.

3-1. Example of an Operation Input in the Map Displaying Application

If, in a state in which an icon corresponding to startup of the map displaying application is displayed on the touch screen 102, the icon is tapped, then the CPU 110 of the portable terminal 100 accepts the touch operation as an operation input for starting up the map displaying application.

Then, the CPU 110 reads out a program of the map displaying application from the nonvolatile memory 111 and executes the program to start up the map displaying application.

Figure 25:
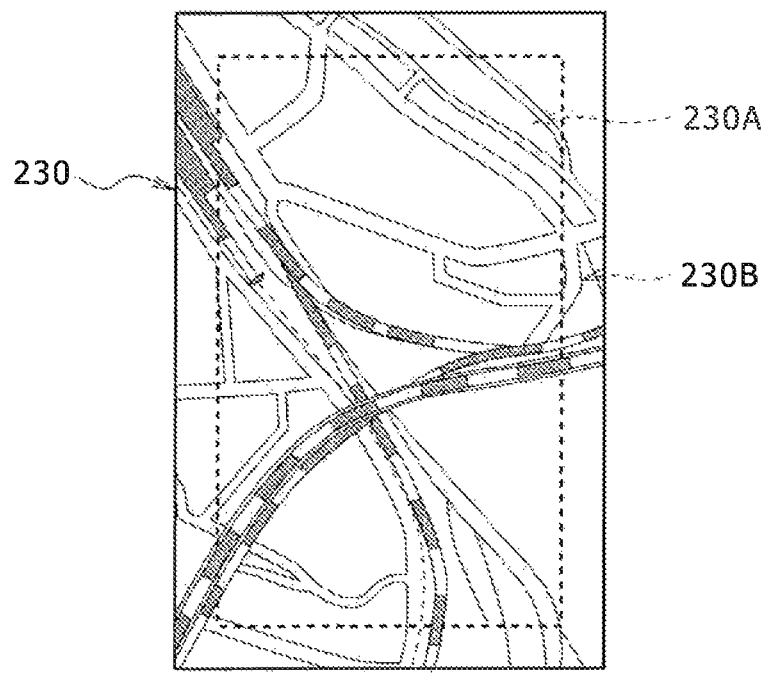
FIG. 25 is a schematic view showing a configuration of a map screen image.

After the map displaying application is started up, the CPU 110 causes a map screen image 230 shown in FIG. 25 to be displayed on the touch screen 102. It is to be noted that the map screen image 230 is a horizontally elongated screen image and is displayed in an overall area of the touch screen 102 assuming use of the portable terminal 100 in a vertically extending state.

The map screen image 230 is divided into two regions including a central region 230A having a rectangular shape centered at the center of the screen, and an outer side region 230B surrounding the outer periphery of the central region 230A. The central region 230A has vertical and horizontal lengths, for example, equal to approximately 80% of those of the screen. A framework Fr1 shown in FIG. 26A representative of the central region 230A is displayed on the map screen image 230.

The CPU 110 reads out map information data of an arbitrary district such as, for example, a district set in advance by the user from the CPU 110 and causes a map image based on the map information data to be displayed on the map screen image 230. It is to be noted that at least part of the map image is displayed on the map screen image 230.

On the map screen image 230, scrolling of the map image can be controlled by dragging.

It is assumed that dragging in a rightwardly upward direction of the screen is carried out actually as seen in FIG. 26A. Thereafter, the CPU 110 decides whether or not the end point of the dragging is included in the central region 230A.

Here, if the end point of the dragging is included in the central region 230A, then the CPU 110 sets the scroll mode to a normal scroll mode and controls the scrolling of the map image in response to the direction and the length of the dragging. In other words, the CPU 110 at this time carries out general scrolling control by dragging.

More particularly, the CPU 110 causes the map image to be scrolled in a direction same as the direction of the dragging by an amount corresponding to the length of the dragging. In FIG. 26A, since the dragging direction is a rightwardly upward direction of the screen, the CPU 110 causes the map image to be scrolled in the rightwardly upward direction of the screen by an amount corresponding to the length of the dragging.

Further, it is assumed that the dragging is continued until the end point of the dragging goes out of the central region 230A, that is, into the outer side region 230B, as seen in FIG. 26B.

In this instance, the CPU 110 transits the scroll mode to a stretchable scroll mode, in which the framework Fr1 is erased from the screen and a stretchable cursor Cs extending from the start point to the end point of the dragging is displayed on the screen. It is to be noted that the stretchable cursor Cs continues to be displayed until the finger is spaced away from the touch screen 102 to end the dragging.

After the stretchable cursor Cs is displayed, the CPU 110 controls the scrolling of the map image in response to the direction and the length of the stretchable cursor Cs.

More particularly, the CPU 110 sets a direction same as the direction of the stretchable cursor Cs displayed as a scroll direction of the map image. Further, the scroll speed is set to a higher value as the length of the stretchable cursor Cs at this time becomes greater.

As a result, if the stretchable cursor Cs is stretched long rightwardly upwards by the dragging in the rightwardly upward direction of the screen as seen in FIG. 26B, then the map image to be displayed on the map screen image 230 is scrolled at a high speed in the rightwardly upward direction.

If the finger is not spaced away from nor moved on the touch screen 102 after such dragging, then the stretchable cursor Cs continues to be displayed without changing the direction and the length thereof and the scroll speed at this time, that is, the scroll direction and the value of the scroll speed, are maintained.

It is assumed further that, after such dragging, the dragging is continued with the finger kept touching until the end point of the stretchable cursor Cs, that is, the end point of the dragging, returns from the outside of the central region 230A into the central region 230A as seen in FIG. 26C.

In this instance, the CPU 110 continues the stretchable scroll mode and continuously controls the scroll speed of the map image in response to the direction and the length of the stretchable cursor Cs. In other words, after the stretchable scroll mode is entered once, the CPU 110 continues the stretchable scroll mode irrespective of the position of the end point of the dragging until after the finger is spaced away from the touch screen 102 to end the dragging.

Thereafter, when the dragging comes to an end, the CPU 110 ends the scrolling of the map image and causes the stretchable cursor Cs in the stretched state to be contracted until it has a circular shape and then causes the stretchable cursor Cs to be erased from the screen while it causes the framework Fr1 to be displayed again.

As described above, in the map displaying application, if dragging is carried out, then the normal scroll mode is used to carry out general scrolling control by dragging until the end point of the dragging goes out of the central region 230A.

On the other hand, in the map displaying application, if the end point of the dragging goes out of the central region 230A, then the stretchable scroll mode is established and the scroll direction and the value of the scroll speed of the map image are controlled in response to the direction and the length of the stretchable cursor Cs.

Consequently, in the map displaying application, only if the user carries out a simple operation of moving the end point of dragging so as to go out of the central region 230A, then transition from general scrolling control by dragging to control of the scroll speed through the stretchable cursor Cs can be carried out.

Accordingly, general scrolling control by dragging or control of the scroll speed through the stretchable cursor Cs can be selected ready only by dragging.

4. Modifications 4-1. Modification 1

In the dynamic image reproduction application in the first embodiment described above, control of the reproduction speed of a chapter, changeover between a chapter and a chapter list, that is, changeover between hierarchies, and control of the adjustment speed of the sound volume are carried out in response to an operation input through the stretchable cursor Cs.

However, also in the other applications, control of the reproduction speed of various contents, changeover between hierarchies, and control of the adjustment speed of various parameters may be carried out in response to an operation input through the stretchable cursor Cs.

For example, in the tune reproduction control, control of the reproduction speed of a tune or track may be carried out in response to an operation input through the stretchable cursor Cs.

In this instance, for example, if a track is selected from within a track list, then the CPU 110 causes related information of the track such as the title, jacket image and so forth of the track to be displayed on the screen and causes the track to be reproduced normally.

If dragging is thereafter carried out in a horizontal direction of the screen, then the CPU 110 causes a horizontally directed stretchable cursor Cs to be displayed in response to the dragging and sets the reproduction direction and the value of the reproduction speed of the track in response to the direction, that is, the leftward or rightward direction, and length of the stretchable cursor Cs.

Further, at this time, if the end point of the stretchable cursor Cs enters a predetermined region provided at a left or right end portion of the screen, then the hierarchy may be changed over such that the display substance of the screen image is transited from the related information of the track to a track list of a higher hierarchy.

Thus, also in the tune reproduction application, control of the reproduction speed of a tune or track and changeover from related information of the track to a track list of a higher hierarchy can be carried out similarly as in the dynamic image reproduction application.

Further, in the tune reproduction application in the first embodiment described hereinabove, the scroll speed of a track list is controlled in response to an operation input through the stretchable cursor Cs.

However, also in the other applications, the scroll speed of various display substances such as an image, a text or a list may be controlled in response to an operation input through the stretchable cursor Cs.

For example, in a Web browser, the scroll speed of a page image may be controlled in response to an operation input through the stretchable cursor Cs.

In this instance, if dragging in a vertical direction of the screen is carried out, for example, in a state in which a page image is displayed on a screen image of a Web browser, then the CPU 110 causes a vertically directed stretchable cursor Cs to be displayed in response to the dragging. Then, the CPU 110 sets a scroll direction and a value of a scroll speed of the page image in response to the direction, that is, the upward or downward direction, and length of the stretchable cursor Cs.

It is to be noted that the scroll direction is not limited to a direction of one dimension, that is, a vertical direction or a horizontal direction, but may be a two-dimensional direction with regard to a display substance which generally extends upwardly, downwardly, leftwardly and rightwardly with respect to a range to be displayed such as a map, a photograph, an expanded document or the like.

Incidentally, depending upon the display substance, intermittent scrolling for each certain unit sometimes facilitates visual confirmation in comparison with continuous scrolling by controlling the scroll speed.

For example, in the case where a list of thumbnail images is scrolled, such intermittent scrolling as to scroll, after standby by several seconds after a first thumbnail image is displayed, the thumbnail image such that a next thumbnail image is displayed improves the visibility of each thumbnail image.

In this instance, not the value of the scroll speed but the standby time period between scrolling operations may be set in response to the length of the stretchable cursor Cs.

By the configuration just described, the scroll direction and the standby time period in intermittent scrolling can be controlled in accordance with the direction and the length of the stretchable cursor Cs.

It is to be noted that whether continuous scrolling is to be carried out or intermittent scrolling is to be carried out may be set by the user. Or, this may be automatically set by the CPU 110 based on setting information set for each display substance.

Incidentally, as another example for which intermittent scrolling is effective, the display substance is a document, a document+table or the like.

Actually, in the case where the display substance is a document, it can be scrolled intermittently, for example, in a unit of a row, a sentence or a page which includes a searched out character string.

On the other hand, in the case where the display substance is a document+table, it is possible to scroll it intermittently, for example, in a unit of a page which includes a table.

Further, not only in applications but also in various kinds of software such as an OS, control of the scroll speed of the display substance, changeover between hierarchies, control of the adjustment speed of various parameters and control of the standby time period may be carried out in response to an operation input through the stretchable cursor Cs. Incidentally, the OS is an abbreviation of Operating System.

For example, in an OS, the scroll speed of a list of folders or a list of files may be controlled in response to an operation input through the stretchable cursor Cs. Or the hierarchy may be changed over from a file to a folder. Further, the adjustment speed of, for example, the resolution of a screen image may be controlled. Furthermore, the standby time period, for example, of a slideshow of images may be controlled.

4-2. Modification 2

Further, in the first embodiment described hereinabove in the still image reproduction application, if an arbitrary place of a still image continues to be touched for a predetermined period of time, that is, is long pressed, then a stretchable cursor Cs is displayed at this position.

Figures 27A, 27B, 27C:
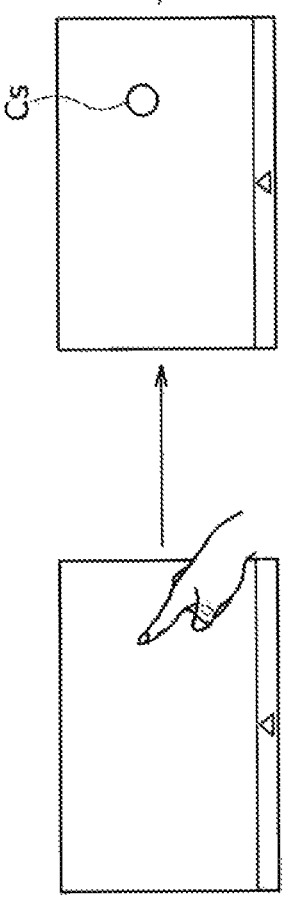
FIGS. 27A to 27C are schematic views illustrating an example of an operation input through the stretchable cursor in a still image reproduction application in a modification.

However, if an arbitrary place of a still image is tapped, that is, touched and then spaced away, as seen in FIG. 27A, then a stretchable cursor Cs may be displayed at the position.

More particularly, if an arbitrary place of a still image is tapped, then the CPU 110 causes a stretchable cursor Cs of a circular shape centered at the position to be displayed and sets the position as the center of zooming. Further, this position becomes a start point of the stretchable cursor Cs.

It is assumed that the circular stretchable cursor Cs is thereafter touched and dragging in a vertical direction of the screen is carried out. In this instance, the CPU 110 stretches the stretchable cursor Cs in the dragging direction from the start point of the stretchable cursor Cs so that the length of the stretchable cursor Cs may be equal to the distance from the start point to the end point of the dragging.

Then, the CPU 110 controls the adjustment speed of the zoom ratio, that is, the "magnification/reduction ratio," of a still image in response to the direction and the length of the stretchable cursor Cs then.

Further, in this instance, the circular stretchable cursor Cs may not necessarily be touched, but also in the case where a portion other than the stretchable cursor Cs is touched and dragging is carried out, the adjustment speed of the zoom ratio can be controlled in a similar manner as in the case where the stretchable cursor Cs is touched and dragging is carried out.

It is assumed that, in a state in which the circular stretchable cursor Cs is displayed, a portion other than the stretchable cursor Cs is touched and dragging in a vertical direction of the screen is carried out as seen in FIGS. 27B and 27C. In this instance, the CPU 110 stretches, in response to the dragging, the stretchable cursor Cs in a direction parallel to the direction of the dragging from the start point of the stretchable cursor Cs such that the length of the stretchable cursor Cs is equal to the distance from the start point to the end point of the dragging.

As a result, the stretchable cursor Cs is stretched similarly as in the case where the stretchable cursor Cs is touched and dragged.

Then, the CPU 110 controls the adjustment speed of the zoom ratio, that is, the "magnification/reduction ratio," of a still image in response to the direction and the length of the stretchable cursor Cs then.

As a result, the adjustment speed of the zoom ratio is controlled similarly to the adjustment speed when the stretchable cursor Cs is touched.

Thus, it is not necessary to strictly touch the stretchable cursor Cs and then carry out dragging, and the operability can be improved. This is more effective particularly in the case where the touch screen 102 is small and the stretchable cursor Cs displayed is small.

Thereafter, when the dragging comes to an end, the CPU 110 causes the stretchable cursor Cs to contract until it has a circular shape and temporarily stops the adjustment of the zoom ratio. Then, if tapping is carried out again, then the CPU 110 causes the stretchable cursor Cs to be erased from the screen and reset the center of zooming, thereby to end the adjustment of the zoom ratio.

It is to be noted that a stretchable cursor Cs may be displayed not only in response to tapping but also in response to some other various operations such as double tapping, which is two successive tapping operations. Furthermore, a stretchable cursor Cs may be displayed also at a point of time at which the CPU 110 decides that a touched position moves for more than a predetermined threshold value and therefore the touch operation is dragging. Further, the manner of displaying such a stretchable cursor Cs may be varied among different applications.

Further, while the long pressed position or the tapped position is set as the center of zooming, the center of zooming may not be set to such positions but may always be set to the center of the screen image.

4-3. Modification 3

Further, for example, in the tune reproduction application in the first embodiment described hereinabove, information of two hierarchies of a track list and an album list is changed over in response to an operation input through the stretchable cursor Cs.

However, information of three or more hierarchies may otherwise be changed over in response to an operation input through the stretchable cursor Cs.

It is assumed here that, for example, a music file is managed in a hierarchical structure of three hierarchies including the highest hierarchy of an artist name, a middle hierarchy of a title of an album and the lowest hierarchy of a title of a track.

In this instance, the CPU 110 first causes, for example, a track list which is information of the lowest hierarchy to be displayed on the track selection screen image 210. Here, it is assumed that, by dragging in a vertical direction of the screen, the end point of the stretchable cursor Cs moves from within the central region 210B into the upper end region 210A or the lower end region 210C. In this instance, the CPU 110 transits the display substance from a track list to an album list which is information of a hierarchy immediately higher than the track list.

It is assumed that the dragging is continued thereafter until the stretchable cursor Cs is contracted to a length smaller than the predetermined threshold value. In this instance, the CPU 110 transits the display substance from an album list to a track list which is a hierarchy immediately lower than the album list.

In contrast, it is assumed that the dragging is continued after changeover to the album list such that, after the end point of the stretchable cursor Cs enters the central region 210B once, it enters the upper end region 210A or the lower end region 210C. In this instance, the CPU 110 transits the display substance from an album list to an artist list which is information of a hierarchy which is immediately higher than the album list.

Further, it is assumed that the dragging is continued thereafter until the stretchable cursor Cs is contracted to a length smaller than the predetermined threshold value. In this instance, the CPU 110 transits the display substance from an artist list to an album list which is information of a hierarchy which is immediately lower than the artist list.

Further, when the dragging comes to an end, the CPU 110 transits the display substance to a track list which is information of the lowest hierarchy irrespective of the display substance at present.

Or, in the various applications, information of a plurality of hierarchies may be successively changed over in response to entering of the end point of the stretchable cursor Cs into a predetermined region set on the screen image.

Further, while, in the dynamic image reproduction application in the embodiments described above, information of hierarchies is changed over from a chapter to a chapter list, changeover may be carried out otherwise such that, for example, the chapter is changed over from a chapter to another chapter.

In particular, it is assumed that the end point of a stretchable cursor Cs moves from within the central region 200B into the right end region 200C as a result of dragging in a horizontal direction of the screen. In this instance, the CPU 110 changes the display substance to a chapter next to the chapter being displayed at present.

It is assumed otherwise such that the end point of the stretchable cursor Cs moves from within the central region 200B into the left end region 200A as a result of dragging in a horizontal direction of the screen. In this instance, the CPU 110 changes the display substance to a chapter immediately preceding to the chapter being displayed at present.

Thereafter, when the dragging comes to an end, the CPU 110 returns reproduction of the chapters displayed then to normal reproduction.

Or, in the various applications, information to be displayed may be changed over successively in response to entering of the end point of the stretchable cursor Cs into a predetermined region set on the screen.

It is to be noted that, although the position and the size of this region are not restricted, in the dynamic picture reproduction application, since the reproduction speed of a chapter is controlled by stretching the stretchable cursor Cs in a horizontal direction, the position is preferably set to a left or right end portion positioned on an extension line of the stretchable cursor Cs.

Further, in the tune reproduction application, since scrolling of a list is controlled by stretching the stretchable cursor Cs in a vertical direction, the position described above is preferably set to an upper or lower end portion.

4-4. Modification 4

Further, in the first embodiment described hereinabove, if an upper end portion of the luminance and saturation pallet 221 displayed at a lower end of the still image reproduction screen image 220 is touched and flicking in an upward direction of the screen is carried out, then the luminance and saturation pallet 221 is pulled out to the screen.

However, the luminance and saturation pallet 221 may be displayed on the screen otherwise when a separate menu is displayed on the still image reproduction screen image 220 and the luminance and saturation setting is selected from within the menu.

Further, in the embodiments described hereinabove, the luminance and saturation pallet 221 is displayed at such a position and with such a size that it occupies the overall area of the screen.

However, the luminance and saturation pallet 221 may otherwise be displayed at such a position and with such a size that it occupies an upper one half or a lower one half of the area of the screen or at such a position and with such a size that it occupies a central portion of the screen which includes a center line which divides the screen equally into two upper and lower portions.

Further, at this time, if the start point of dragging is a place which is not covered with the luminance and saturation pallet 221, then the still image displayed on the screen may be scrolled in response to the dragging.

In this instance, the CPU 110 controls scrolling of the still image in response to the direction and the length of the dragging or flicking.

In this manner, if the start point of dragging is within the luminance and saturation pallet 221 and on a still image outside the luminance and saturation pallet 221 for the luminance and the saturation, then the process to be executed may be changed in response to the position of dragging, for example, to scrolling of the still image.

Further, in the first embodiment described hereinabove, the luminance and saturation pallet 221 including the luminance setting region 221L for adjusting the luminance and the saturation setting region 221R for adjusting the saturation is displayed.

However, a luminance pallet not shown which includes, for example, a luminance increasing region for increasing the luminance and a luminance decreasing region for decreasing the luminance may otherwise be displayed.

In this instance, if dragging in a vertical direction is carried out from a start point included in the luminance increasing region, then a stretchable cursor Cs directed vertically is displayed, and the luminance is increased with a value of an adjustment speed corresponding to the length of the stretchable cursor Cs.

Meanwhile, if dragging in a vertical direction is carried out from a start point included in the luminance decreasing region, then a stretchable cursor Cs directed vertically is displayed, and the luminance is decreased with a value of an adjustment speed corresponding to the length of the stretchable cursor Cs.

4-5. Modification 5

Further, in the first embodiment described hereinabove, the disclosed technology is applied to the portable terminal 100 which includes the touch screen 102 as an operation device.

However, the disclosed technology may be and can be applied to information processing apparatus which include various other operation devices.

In particular, the disclosed technology can be applied to any information processing apparatus which includes an operation device which can carry out dragging such as a mouse, a touch pad with a button, a joystick with a button, an analog stick capable of being operated to be pushed in, a camera and so forth.

In the case where dragging is actually carried out using a mouse, the CPU 110 causes, for example, a pointer, which moves in response to movement of the mouse, to be displayed on the screen. Thereafter, if the user moves the pointer to a desired position and clicks a button of the mouse, then a start point of dragging is designated. Here, the CPU 110 causes a stretchable cursor Cs to be displayed. Then, while a button of the mouse is pressed, the user would move the mouse to move the end point of dragging, that is, the end point of the stretchable cursor Cs, to carry out dragging.

On the other hand, in the case where dragging is carried out using a touch pad with a button, the CPU 110 causes, for example, a pointer, which moves in response to a touch operation for the touch pad, to be displayed on the screen. Thereafter, the user would designate a start point of dragging by moving the pointer to a desired position and pressing a button of the touch pad. Here, the CPU 110 causes the stretchable cursor Cs to be displayed. Then, the user would carry out dragging by moving the touched position while the button is kept pressed to move the end point of the dragging, that is, the end point of the stretchable cursor Cs.

Further, in the case where a joystick is used to carry out dragging, the CPU 110 causes, for example, a pointer, which moves in response to tilting of the joystick, to be displayed on the screen. Thereafter, the user would designate a start point of dragging by moving the pointer to a desired position and pressing a button of the joystick. Here, the CPU 110 causes a stretchable cursor Cs to be displayed. Then, the user would carry out dragging by tilting, while the button is kept pushed in, the joystick to move the end point of the dragging, that is, the end point of the stretchable cursor Cs.

Further, in the case where an analog stick is used to carry out dragging, the CPU 110 causes, for example, a pointer, which moves in response to tilting of the analog stick, to be displayed on the screen. Thereafter, the user would designate a start point of dragging by moving the pointer to a desired position and pushing in the analog stick. Here, the CPU 110 causes a stretchable cursor Cs to be displayed. Then, the user would carry out dragging by tilting, while the analog stick is kept pushed in, the analog stick to move the end point of the dragging, that is, the end point of the stretchable cursor Cs.

Further, in the case where a camera is used to carry out dragging, the CPU 110 recognizes, for example, a movement of a finger based on an image picked up by the camera and causes a pointer, which moves in response to the movement of the finger, to be displayed on the screen. Thereafter, the user would designate a start point of dragging by moving the pointer to a desired position and carrying out a predetermined gesture such as, for example, a gesture of drawing a circle by a finger. Here, the CPU 110 causes a stretchable cursor Cs to be displayed. Then, the user would carry out dragging by moving a finger to move the end point of dragging, that is, the end point of the stretchable cursor Cs.

It is to be noted that the operation described above is an example and, in a word, any operation may be used if it designates a start point and an end point of dragging.

Further, if an information processing apparatus includes such operation devices as described above other than the touch screen 102, the operation devices may be provided separately from the display device or may be connected to an external display device.

4-6. Modification 6

Further, in the first embodiment described hereinabove, a stretchable cursor Cs is displayed in response to dragging.

Here, processing information regarding what process is being carried out at present may be displayed on the screen in response to an operation input through the stretchable cursor Cs together with the stretchable cursor Cs.

For example, when a dynamic image is reproduced at an arbitrary reproduction speed in response to an operation input through the stretchable cursor Cs, the CPU 110 causes such characters representing a reproduction direction at this time as, for example, "fast feeding" or "rewinding" to be displayed on the screen. Further, such characters which directly represent a reproduction direction and a value of a reproduction speed as, for example, "2.0×" or "−1.5×" or such patterns which indirectly represent a reproduction direction and a value of a reproduction speed as, for example, ">>" or "<<<" may be displayed.

By such display, it is possible to allow the user to readily confirm what process is being currently carried out in response to an operation input through the stretchable cursor Cs.

Further, if the value of the reproduction speed reaches its maximum value, then the stretchable cursor Cs may be suppressed from being stretched any more. Further, at this time, the stretchable cursor Cs may be displayed in a flickering fashion, or information representative of a reproduction direction and a value of a reproduction speed described above such as "2.0×" or ">>" may be displayed in a flickering fashion.

In other words, the displaying form of the stretchable cursor Cs or information representative of a value of reproduction speed may be changed so that it can be recognized by the user that the value of the reproduction speed reaches the maximum value.

4-7. Modification 7

Further, in the first embodiment described hereinabove in the tune reproduction application, if the length of the stretchable cursor Cs becomes smaller than the predetermined threshold value after transition to an album list, then the CPU 110 transits back to a track list from the album list.

Here, this operation may be applied to the dynamic image reproduction application. In particular, the dynamic image reproduction application may be configured such that, when the length of the stretchable cursor Cs becomes smaller than the predetermined threshold vale after transition to a chapter list, the CPU 110 transits back to a chapter from a chapter list.

4-8. Modification 8

Further, in the first embodiment described hereinabove, a reproduction direction and a value of a reproduction speed of a dynamic image may be controlled in response to the direction and the length of the stretchable cursor Cs.

However, the reproduction direction may be fixed while only the value of the reproduction speed of a dynamic image is controlled in response only to the length of the stretchable cursor Cs irrespective of the direction of the stretchable cursor Cs.

Or, the value of the reproduction speed of a dynamic image may be fixed while only the reproduction direction of a dynamic image is controlled in response only to the direction of the stretchable cursor Cs.

Further, the scroll direction of a track list may be fixed while only the value of the scroll speed of a track list is controlled in response only to the length of the stretchable cursor Cs irrespective of the direction of the stretchable cursor Cs.

Furthermore, the value of the scroll speed of a track list may be fixed while only the scroll direction of a track list is controlled in response only to the direction of the stretchable cursor Cs irrespective of the length of the stretchable cursor Cs.

Furthermore, the value of the adjustment speed of the sound volume may be fixed while only the adjustment direction of the sound volume is controlled in response only to the direction of the stretchable cursor Cs irrespective of the length of the stretchable cursor Cs.

Further, not only reproduction of a content, changeover of the display substance, scrolling of a list and adjustment of a parameter but also various processes may be executed by an operation input through the stretchable cursor Cs.

4-9. Modification 9

Further, in the first and second embodiments described hereinabove, the portable terminal 100 includes the touch screen 102 configured from the liquid crystal panel 102A and the touch panel 102B of the capacitance type.

However, a liquid crystal display apparatus which incorporates a touch panel function may be provided in the portable terminal 100 in place of the touch screen 102.

Also for the liquid crystal panel 102A, various other display apparatus such as an EL (Electroluminescence display) apparatus may be used instead.

4-10. Modification 10

Further, in the first and second embodiments, the stretchable cursor Cs is shaped such that the width thereof increases from the start point C1 side toward the end point C2 side.

However, the stretchable cursor Cs may have any of various other shapes only if it connects at least a start point and an end point of dragging to each other. Also with regard to the size of the stretchable cursor Cs, it may have any of various other sizes.

4-11. Modification 11

Further, in the map displaying application in the second embodiment described hereinabove, if the end point of dragging goes out of the central region 230A, then the stretchable scroll mode is established such that control of the scroll speed of a map image is carried out in response to an operation input through the stretchable cursor Cs.

However, in the map displaying application, if dragging is carried out, then the stretchable scroll mode may always be established irrespective of the position of the end point of the dragging such that control of the scroll speed of a map image is carried out in response to an operation input through the stretchable cursor Cs.

Figure 28:
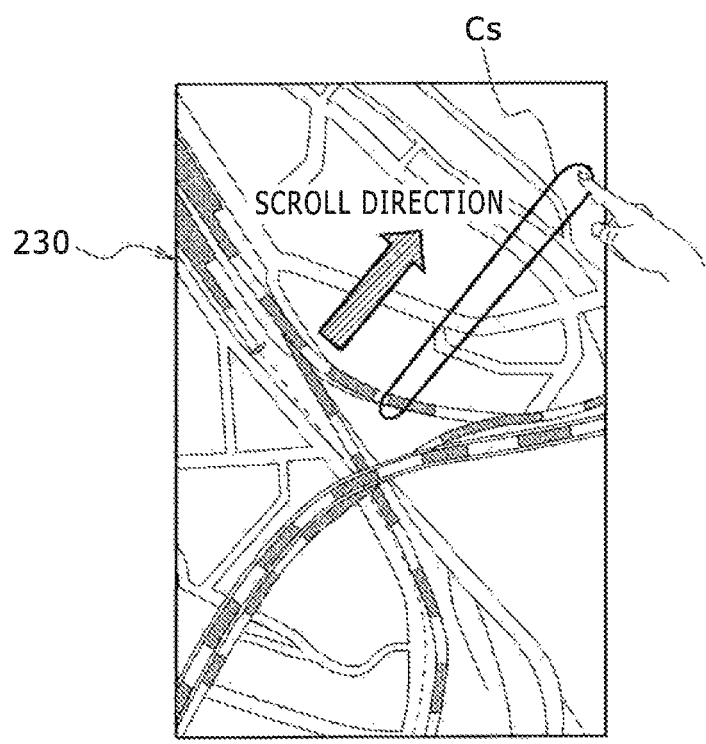
FIG. 28 is a schematic view illustrating an example of an operation input through the stretchable cursor in the map displaying application in a modification.

In this instance, if dragging is carried out, then the CPU 110 causes a stretchable cursor Cs to be displayed in response to the dragging as seen in FIG. 28. Then, the CPU 110 sets a direction same as the direction of the stretchable cursor Cs displayed as the scroll direction of a map image, and sets the value of the scroll speed to a higher value as the length of the stretchable cursor Cs becomes longer.

Or, in the map displaying application, changeover between the normal scroll mode and the stretchable scroll mode may be carried out in response to whether or not the start point of dragging is within a predetermined region of the screen.

Figure 29A:
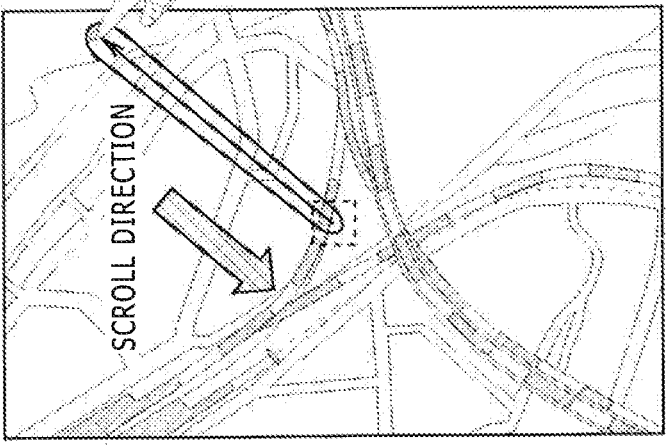
FIGS. 29A to 29C are schematic views illustrating an example of an operation input through the stretchable cursor in the map displaying application in another modification.

In this instance, a central region 230C in the form of a rectangular region of a size with which, for example, the image screen image 230 protrudes a little from a finger is set to a middle portion of the map screen image 230 as seen in FIG. 29A. If the map displaying application is started up, then the CPU 110 causes a map image to be displayed on the map screen image 230 and causes a framework Fr2 representative of the central region 230C to be displayed.

Then, if dragging is carried out, then the CPU 110 decides whether or not the start point of the dragging is included in the central region 230C.

Figure 29B:
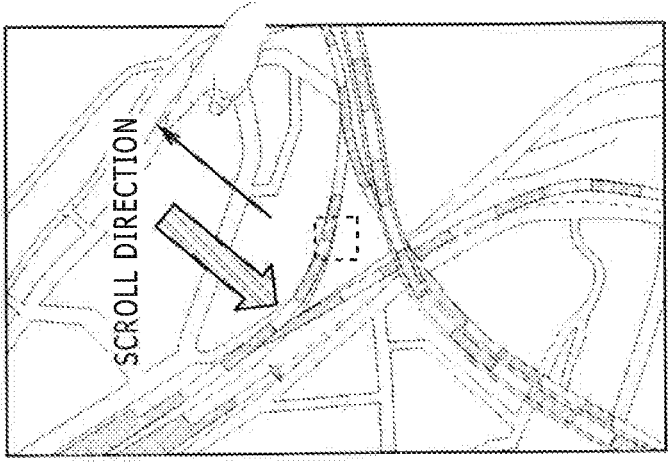

Here, if the start point of the dragging is outside the central region 230C as seen in FIG. 29B, then the CPU 110 sets the scroll mode to the normal scroll mode and causes the framework Fr2 to be erased from the screen.

Then, the CPU 110 controls scrolling of the map image in response to the direction and the length of the dragging. In particular, the CPU 110 scrolls the map image by an amount corresponding to the length of the dragging in a direction opposite to the direction of the dragging.

Figure 29C:
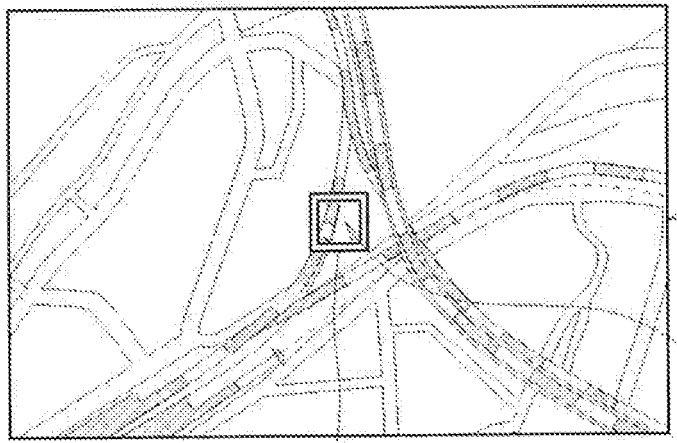

On the other hand, if the start point of the dragging is included in the central region 230C as seen in FIG. 29C, then the CPU 110 sets the scroll mode to the stretchable scroll mode. At this time, the CPU 110 causes the framework Fr2 to be erased from the screen and causes a stretchable cursor Cs, which extends from the start point to the end point of the dragging, to be displayed on the screen.

After the stretchable cursor Cs is displayed, the CPU 110 controls scrolling of the map image in response to the direction and the length of the stretchable cursor Cs.

In particular, the CPU 110 sets the direction opposite to the direction of the stretchable cursor Cs displayed to the scroll direction of the map image. Further, the CPU 110 sets the value of the scroll speed to a higher value as the length of the stretchable cursor Cs then becomes greater.

After the dragging comes to an end, the CPU 110 ends the scrolling of the map image and causes, if the stretchable cursor Cs is displayed then, the stretchable cursor Cs to be erased from the screen and then causes the framework Fr2 to be displayed again.

In this manner, when the start point of dragging is outside the central region 230C, the CPU 110 carries out general scrolling control by dragging, but when the start point of the dragging is within the central region 230C, the CPU 110 carries out control of the scroll speed through the stretchable cursor Cs.

Consequently, if the user carries out a simple and easy operation of changing the start point of dragging, then the portable terminal 100 allows the user to readily select general scrolling control by dragging or control of the scroll speed through a stretchable cursor Cs.

4-12. Modification 12

Further, in the tune reproduction application in the first embodiment described hereinabove, the scroll direction of a track list is set so as to be a direction opposite to the direction of the stretchable cursor Cs.

However, in the tune reproduction application, the scroll direction of a track list may otherwise be set to the same direction as that of the stretchable cursor Cs.

Further, in the other applications, the scroll direction may be set to the same direction as that of the stretchable cursor Cs or the scroll direction may be set to the opposite direction to that of the stretchable cursor Cs. In a word, whether the scroll direction is set to the same direction as that of the stretchable cursor Cs or to the opposite direction to that of the stretchable cursor Cs may be set suitably in each application.

4-13. Modification 13

Further, in the first and second embodiments described hereinabove, the portable terminal 100 as an information processing apparatus includes the touch screen 102 as an operation section and a display section, and the CPU 110 as a control section.

However, each functioning section of the portable terminal 100 described hereinabove, that is, each of the operation section, control section and display section, may be configured from various types of hardware only if it has a similar function.

4-14. Modification 14

Further, in the first and second embodiments described hereinabove, programs for executing various processes are written in the nonvolatile memory 111 of the portable terminal 100.

However, for example, the portable terminal 100 may have a slot for a storage medium such as a memory card such that the CPU 110 reads out a program from a storage medium inserted in the slot and executes the program. Or, the program read out from the storage medium may be installed into the nonvolatile memory 111. Furthermore, the CPU 110 may download the program from an apparatus on a network through the network interface 113 and installed into the nonvolatile memory 111.

4-15. Modification 15

Further, the disclosed technology is not limited to the first and second embodiments and the modifications described above. In particular, the disclosed technology may be carried out in such forms that some or all of the features of the first and second embodiments and the modifications described hereinabove are combined arbitrarily or removed.

The disclosed technology can be utilized widely for information processing apparatus and so forth wherein an operation input by dragging is possible.

While preferred embodiments of the present disclosure have been described using specific terms, such description is for illustrative purpose only, and it is to be understood that changes and variations may be made without departing from the spirit or scope of the following claims.

What is claimed is:

1. An information processing apparatus, comprising:
    at least one memory configured to store computer readable instructions;
    an input interface; and
    a processor configured to execute the computer readable instructions to
        cause, when dragging is carried out through the input interface, a cursor interconnecting a start point and an end point of the dragging to be displayed on a display section in response to the dragging and execute, where a direction from one end portion of the cursor which is a start point side of the dragging to an other end portion of the cursor which is an end point side of the dragging is determined as a direction of the cursor, a process corresponding to the direction of the cursor for information displayed on the display section,
        execute a first process including changing the information to be displayed on the display section based on the other end portion of the cursor entering a predetermined region set on the display section during the dragging, and
        execute a second process corresponding to the direction and a length of the cursor for the information displayed on the display section, a degree to which the process is executed being based on the length of the cursor based on the other end portion of the cursor being outside of the predetermined region during the dragging,
    wherein the second process corresponding to the direction and length of the cursor is at least one of
        a process of reproducing a dynamic image at a reproduction speed corresponding to the direction and the length of the cursor, or
        a process of changing of a zoom ratio at a speed of changing of the zoom ratio corresponding to the direction and length of the cursor, and
    wherein displaying of the information by the second process is different than the changing of the information by the first process.

2. The information processing apparatus according to claim 1, wherein the processor is further configured to execute the computer readable instructions to
    cause, from between first hierarchy information of a first hierarchy and second hierarchy information of a second hierarchy which is a higher hierarchy with respect to the first hierarchy, the first hierarchy information to be displayed on the display section, but
    change, when the other end portion of the cursor enters the predetermined region set on the display section during the dragging, the information to be displayed on the display section from the first hierarchy information to the second hierarchy information.

3. The information processing apparatus according to claim 2, wherein the processor is further configured to execute the computer readable instructions to return, if, after the information to be displayed on the display section is changed from the first hierarchy information to the second hierarchy information, the dragging is continued until the length of the cursor becomes smaller than a predetermined threshold value, the information to be displayed on the display section from the second hierarchy information to the first hierarchy information.

4. The information processing apparatus according to claim 3, wherein
    the first hierarchy information is a dynamic image while the second hierarchy information is an extracted image list configured from images extracted from the dynamic image, and
    the processor is further configured to execute the computer readable instructions to
        cause the dynamic image to be displayed on the display section,
        execute the first process including changing, based on the other end portion of the cursor entering the predetermined region set on the display section by the dragging, the information to be displayed on the display section from the dynamic image to the extracted image list,
        execute, when the dynamic image is displayed on the display section, the second process including reproducing the dynamic image at a reproduction speed corresponding to the direction and the length of the cursor based on the cursor being outside of the predetermined region during the dragging, and
        execute, when the extracted image list is displayed on the display section, a third process of scrolling the extracted image list at a scroll speed corresponding to the direction and the length of the cursor.

5. The information processing apparatus according to claim 3, wherein the first hierarchy information is a track list configured from titles of tunes while the second hierarchy information is an album list configured from albums in which the tunes are collected, and
    the processor is further configured to execute the computer readable instructions to
        cause the track list to be displayed on the display section,
        change, based on the other end portion of the cursor entering the predetermined region set on the display section by the dragging, the information to be displayed on the display section from the track list to the album list,
        execute, when the track list is displayed on the display section, the first process by scrolling the track list at a scroll speed corresponding to the direction and the length of the cursor, and
        execute, when the album list is displayed on the display section, the first process by scrolling the album list at a scroll speed corresponding to the direction and the length of the cursor.

6. The information processing apparatus according to claim 3, wherein the processor is further configured to execute the computer readable instructions to erase, when the dragging comes to an end, the display of the cursor and returns the information to be displayed on the display section to the first hierarchy information.

7. The information processing apparatus according to claim 3, wherein the processor is further configured to execute the computer readable instructions to change, when the information to be displayed on the display section is changed from the first hierarchy information to the second hierarchy information and then the dragging is continued until the other end portion of the cursor goes out of the predetermined region and then enters the predetermined region again, the information to be displayed on the display section from the second hierarchy information to third hierarchy information of a third hierarchy which is a higher hierarchy with respect to the second hierarchy.

8. The information processing apparatus according to claim 3, wherein the region is set to an end portion of the display section.

9. An Information processing method, comprising:
causing, by a processor, when dragging is carried out through an input interface, a cursor interconnecting a start point and an end point of the dragging to be displayed on a display section in response to the dragging and executing, where a direction from one end portion of the cursor which is a start point side of the dragging to an other end portion of the cursor which is an end point side of the dragging is determined as a direction of the cursor, a first process corresponding to the direction of the cursor for information displayed on the display section;
executing, by the processor, a first process involving changing the information to be displayed on the display section based on the other end portion of the cursor entering a predetermined region set on the display section during the dragging; and
executing a second process corresponding to the direction and a length of the cursor for the information displayed on the display section based on the other end portion of the cursor being outside of the predetermined region during the dragging, a degree to which the second process is executed being based on the length of the cursor,
wherein the second process corresponding to the direction and length of the cursor is at least one of
a process of reproducing a dynamic image at a reproduction speed corresponding to the direction and the length of the cursor, or
a process of changing of a zoom ratio at a speed of changing of the zoom ratio corresponding to the direction and length of the cursor, and
wherein displaying of the information by the second process is different than the changing of the information by the first process.

10. A non-transitory computer readable medium including computer readable instructions that when executed by a processor cause the processor to:
cause, when dragging is carried out through an input interface, a cursor interconnecting a start point and an end point of the dragging to be displayed on a display section in response to the dragging and executing, where a direction from one end portion of the cursor which is a start point side of the dragging to an other end portion of the cursor which is an end point side of the dragging is determined as a direction of the cursor, a process corresponding to the direction of the cursor for information displayed on the display section;
executing a first process involving changing the information to be displayed on the display section based upon the other end portion of the cursor entering a predetermined region set on the display section during the dragging; and
executing a second process corresponding to the direction and a length of the cursor for the information displayed on the display section based upon the other end portion of the cursor being outside of the predetermined region during the dragging, a degree to which the process is executed being based on the length of the cursor,
wherein the second process corresponding to the direction and length of the cursor is at least one of
a process of reproducing a dynamic image at a reproduction speed corresponding to the direction and the length of the cursor, or
a process of changing of a zoom ratio at a speed of changing of the zoom ratio corresponding to the direction and length of the cursor, and
wherein displaying of the information by the second process is different than the changing of the information by the first process.

11. An information processing apparatus, comprising:
at least one memory configured to store computer readable instructions;
an input interface; and
a processor configured to execute the computer readable instructions to
cause, when dragging is carried out through the input interface, a cursor interconnecting a start point and an end point of the dragging to be displayed on a display section in response to the dragging and execute, where a direction from one end portion of the cursor which is a start point side of the dragging to an other end portion of the cursor which is an end point side of the dragging is determined as a direction of the cursor, a process corresponding to the direction of the cursor for information displayed on the display section,
execute a process corresponding to the direction and a length of the cursor for the information displayed on the display section, a degree to which the process is executed being based on the length of the cursor,
cause, from between first hierarchy information of a first hierarchy and second hierarchy information of a second hierarchy which is a higher hierarchy with respect to the first hierarchy, the first hierarchy information to be displayed on the display section,
change, when the other end portion of the cursor enters a predetermined region set on the display section by the dragging, the information to be displayed on the display section from the first hierarchy information to the second hierarchy information, and
return, if, after the information to be displayed on the display section is changed from the first hierarchy information to the second hierarchy information, the dragging is continued until the length of the cursor becomes smaller than a predetermined threshold value, the information to be displayed on the display section from the second hierarchy information to the first hierarchy information,
wherein the process corresponding to the direction and length of the cursor is at least one of
a process of scrolling at a scroll speed corresponding to the direction and the length of the cursor, or
a process of changing a parameter of the information processing apparatus at a speed of parameter change corresponding to the direction and length of the cursor.

12. The information processing apparatus of claim 11 wherein,
the process corresponding to the direction and length of the cursor is the process of scrolling at the scroll speed corresponding to the direction and the length of the cursor, and the process of scrolling at the scroll speed corresponding to the direction and the length of the cursor is at least one of,
- a process of scrolling an extracted image list at a scroll speed corresponding to the direction and the length of the cursor,
- a process of scrolling a track list at a scroll speed corresponding to the direction and the length of the cursor, or
- a process of scrolling an album list at a scroll speed corresponding to the direction and the length of the cursor.

* * * * *